United States Patent [19]

Miyazawa

[11] Patent Number: 4,593,932

[45] Date of Patent: Jun. 10, 1986

[54] OUTRIGGER DEVICE FOR WHEEL-MOUNTED WORKING MACHINES

[75] Inventor: Hiroshi Miyazawa, Akashi, Japan

[73] Assignee: Kabushiki Kaisha Kobe Seiko Sho, Kobe, Japan

[21] Appl. No.: 409,145

[22] Filed: Aug. 18, 1982

[30] Foreign Application Priority Data

| | | | |
|---|---|---|---|
| Aug. 18, 1981 | [JP] | Japan | 56-130016 |
| Oct. 9, 1981 | [JP] | Japan | 56-161119 |
| Feb. 22, 1982 | [JP] | Japan | 57-27924 |
| Jun. 10, 1982 | [JP] | Japan | 57-100108 |

[51] Int. Cl.[4] .................. B60S 9/12

[52] U.S. Cl. .................. 280/765.1; 212/189

[58] Field of Search .................. 280/765.1, 766.1, 763.1; 212/189; 254/423

[56] References Cited

U.S. PATENT DOCUMENTS

| | | | |
|---|---|---|---|
| 3,087,627 | 4/1963 | Bill | 280/765.1 |
| 3,825,095 | 7/1974 | Clark | 280/765.1 |
| 3,871,685 | 3/1975 | Senelet | 280/766.1 |
| 4,067,595 | 1/1978 | Vigerie | 280/766.1 |

FOREIGN PATENT DOCUMENTS

| | | | |
|---|---|---|---|
| 869011 | 3/1983 | Fed. Rep. of Germany | 280/765.1 |

*Primary Examiner*—David M. Mitchell
*Attorney, Agent, or Firm*—Oblon, Fisher, Spivak, McClelland & Maier

[57] ABSTRACT

An outrigger device for wheel-mounted working machines includes a fixed box secured to a wheel-mounted traveling body, an extensible beam storably fitted in the fixed box, and a jack cylinder having a float on the lower end thereof and pivotally connected to the front end of the extensible beam, the jack cylinder being swingable around the axis of the pivot between a vertical position and a stored position where it is inwardly drawn into the extensible beam. Thus, when the outrigger is stored, the jack cylinder is drawn toward the extensible beam while turning around the axis of the pivot at its upper end until it is stored in the beam in an inclined state. This arrangement minimizes the amount of projection of the jack cylinder above the machine and makes it possible to receive the float within the machine width while providing protection of the rod of the jack cylinder and increased durability of the cylinder.

15 Claims, 41 Drawing Figures

OUTRIGGER DEVICE FOR WHEEL-MOUNTED WORKING MACHINES

BACKGROUND OF THE INVENTION

1. Field of the Invention

The present invention relates to an outrigger device to be installed on a wheel-mounted working machine, such as a truck crane, rough terrain crane, or wheel shovel and more particularly it relates to an outrigger device for wheel-mounted working machines which is so arranged as to minimize its unnecessary vertical projection, its unnecessary extension from the machine width, the amount of projection of the jack cylinder above the machine and to enable the float to be received within the machine width.

2. Description of the Prior Art

These type of outrigger devices are installed with two on each of the front and rear sides of a traveling body, in an H-shaped arrangement as a whole, wherein each outrigger device comprises a fixed box secured to the traveling body, an extensible beam extensibly and storably fitted in said fixed box, and an extensible jack cylinder having a float on the lower end thereof, said jack cylinder being fixed in its vertical position to the front end of said extensible beam.

These types of conventional outrigger devices, however, present the following problems.

These type of wheel-mounted working machines have various restrictions imposed on their body construction because they travel on highways. The limited level of the lower surface of the machine above the ground is one of the restrictions. Thus, the jack cylinder of the outrigger device is required to have an extension stroke which is the sum of said machine level and a stroke for lifting the machine above the ground. For this reason, the overall length of the jack cylinder must be increased and this increase adds to the amount of projection above the machine. Thus, since the jack cylinder projects well above the machine, it interfers with pile driving work, loading work with the truck positioned in close proximity to the machine and other so-called proximity work, thus causing great inconvenience with work. This is the first problem.

Further, to increase the stability of the machine support, it is desirable that the extensible beam project laterally outwardly of the machine as long as possible. For this reason, the jack cylinder is so designed as to minimize its unnecessary vertical projection and unnecessary extension in the direction of the width of the machine. With this design, however, the float mounted on the lower end of the jack cylinder will have its substantially outer half projecting outwardly of the machine width. Thus, it has been common practice to remove the float each time the machine travels on a highway, and the removal of the float has been very troublesome. Further, because of this requirement for mounting and unmounting the float, it has been necessary to reduce the float size in order to reduce the float weight, which is disadvantageous from the standpoint of stability of the machine support.

SUMMARY OF THE INVENTION

An object of the invention is to provide an outrigger device for wheel-mounted working machines which is so arranged as to minimize its unnecessary vertical projection and unnecessary extension from the machine width and the amount of projection of the jack cylinder above the machine, while enabling the float to be received within the machine width and provide protection of the jack cylinder and increased durability of the rod of the jack cylinder. Another object is to achieve the construction of such outrigger device in a very simple and rational manner.

According, the main feature of the invention consists in pivotally connecting the jack cylinder to the front end of the extensible beam to allow it to swing in a vertical plane around the axis of the pivot, and drawing said cylinder toward the extensible beam to store it in an inclined position. Other features reside in the following arrangements.

An arrangement wherein with the aforesaid main feature or arrangement is a prerequisite and, when it is desired to store the jack cylinder in the extensible beam, wherein a projection formed on the upper end of the jack cylinder is pushed by the front end of the fixed box, whereby the jack cylinder is automatically moved from the vertical position it assumes under its own weight to said inclined stored position and it is held in the latter position.

An arrangement wherein the change of jack cylinder position from its stored state to its vertical state and vice versa is automatically effected in operative association with the extension and contraction of the extensible cylinder.

An arrangement wherein an auxiliary extension cylinder is provided to increase the limit of extension of the extensible beam.

An arrangement wherein a stop mechanism is provided to prevent extension and contraction of the jack cylinder in its inclined stored position otherwise caused by malfunctioning, and wherein extension of the extensible beam is prevented if it becomes impossible for the jack cylinder to swing from its inclined stored position to its vertical position.

An arrangement wherein said extensible beam is in the form of a multi-stage extensible beam and the swingable jack cylinder is attached to the foremost extensible beam section.

An arrangement wherein the change of jack cylinder position in the preceding arrangement is automatically effected in operative association with the extension and contraction of the extensible beam.

An arrangement wherein the swing movement of the jack cylinder from its vertical position to its inclined storage position is automatically effected by outwardly pushing a projection formed on the upper end of the cylinder by the front end of the fixed box at the time of storage in the extensible beam, while the movement from said inclined storage position to the vertical position can be made not only in a spontaneous manner under the weight of the jack cylinder but also in a forced manner by urging a projection on the outer surface of the jack cylinder against a cam surface on the inner surface of the extensible beam due to the extension and contraction of said cylinder.

An arrangement wherein the jack cylinder is attached to the extensible beam, with the cylinder tube oriented downwardly and the cylinder rod upwardly.

An arrangement wherein with the above arrangement as a prerequisite, the positional change of the jack cylinder from the inclined storage position to the vertical position and vice versa is automatically effected by a rack and pinion combination.

An arrangement wherein said positional change is automatically effected by a rack on the jack cylinder cooperating with a pinion on the extensible beam.

Various other objects, features and atendant advantages of the present invention will be more fully appreciated as the same become better understood from the following detailed description when considered in connection with the accompanying drawings in which like reference characters designate like or corresponding parts through the several views and wherein:

DETAILED DESCRIPTION OF THE PREFERRED EMBODIMENTS

Various embodiments of the invention will now be described with reference to FIGS. 1 through 4.

Numeral 1 denotes a traveling body frame; 2 denotes a fixed box; 3 denotes an extensible beam extensibly and storably fitted in said fixed box; 4 denotes an extensible cylinder; 5 denotes a jack cylinder attached to the front end of said extensible beam; and 6 denotes a float mounted on the lower end of said jack cylinder. The extensible cylinder 4 is attached at its rod end to the proximal inner surface of the extensible beam and at its cylinder bottom to the distal inner surface of the fixed box 1, so that the extension and contraction of said extensible cylinder 4 cause the extensible beam to extend from the fixed box 2 and to be stored therein.

Figure 1:
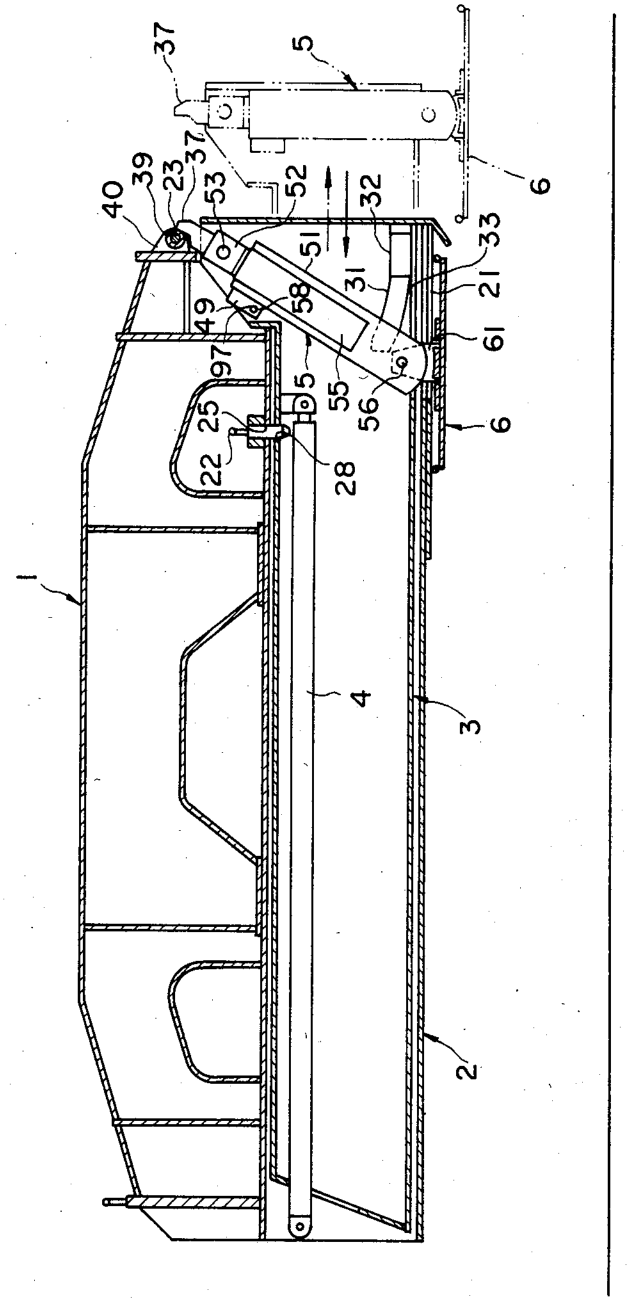
FIG. 1 is a front view, in longitudinal section, of a first embodiment of the invention, showing a jack cylinder in its stored position.

The jack cylinder 5 is attached to the front end of the extensible beam 3, with its cylinder tube 51 oriented downwardly and its rod 52 oriented upwardly, which is reverse to the conventional cylinder positioning, the rod end being pivotally connected to the extensible beam 3 by a horizontal pin extending transversely of the machine. Thus, the jack cylinder 5 is attached to the front end of the extensible beam so that it is swingable longitudinally (widthwise) of the machine. When the outrigger is not used (during travel on a highway), said cylinder is drawn from its vertical position established by its own weight toward the beam 3, while turning around the axis of the pivot at its upper end, until it is stored in an inclined state in said beam 3, as shown in FIG. 1.

A projection 37 is formed on the upper end of the jack cylinder 5, i.e., on the front end of the rod 52, while a transversely and horizontally extending pusher pin 39 is installed in a bracket 40 at a position opposed to said projection 37. Numeral 23 denotes a collar fitted on said pusher pin 39. The projection 37 on the jack cylinder 5 will abut against the pusher pin 39 immediately before the end of a stroke for drawing the beam 3 during extensible beam storage operation and will be pushed by the pusher pin 39 on the remaining stroke, so that the jack cylinder 5 will be automatically swung into said inclined stored position.

In addition, the abutment surface of the projection 37 associated with the pusher pin 39 is substantially L-shaped, as shown, to provide for a stabilized abutted condition.

Locking means for holding the jack cylinder 5 in its vertical position will now be described.

Projections 55 are provided on transversely opposite sides of the cylinder tube 51 of the jack cylinder 5, extending from the upper end of said tube to a predetermined position on the lower portion of said tube. The front inner lower surface portion of the jack cylinder 5 has fixed thereto, on transversely opposite sides, guides 31 extending along an arc having its center of curvature located at the pivot 53 of the jack cylinder 5, with the lower end surfaces of said projections 55 on the jack cylinder 5 being opposed to said guides 31. The guides 31 are each formed with anengaging recess having a width capable of receiving the associated projection 55, the position of said engaging recesses being such that a perpendicular extending from the pivot 53 of the jack cylinder 5 coincides with the centerline of the recesses. Thus, when the jack cylinder 5 assumes its vertical position, the projections 55 are positioned above said engaging recesses 32, so that extension of said cylinder causes the projections 55 to fit in the engaging recesses 32, as shown in FIGS. 1 and 2.

In addition, notches 21 and 33 are formed in the front end lower surfaces of the fixed box 2 and extensible beam 3 to allow for swinging movement of the jack cylinder 5. Numeral 25 denotes a locking hole in the front upper surface of the fixed box and 28 denotes a locking hole in the front upper surface of the extensible beam 3, said locking holes 25 and 28 being adapted to receive a locking pin 22 to lock the extensible beam 3 in its stored position.

The float 6 is pivotally connected to the cylinder tube 56 of the jack cylinder 5 by pins 56 extending from opposite sides of the lower end portion of the cylinder tube and is received in vertically elongated openings 62 (FIG. 3) formed in float attaching seats 61.

Figure 2:
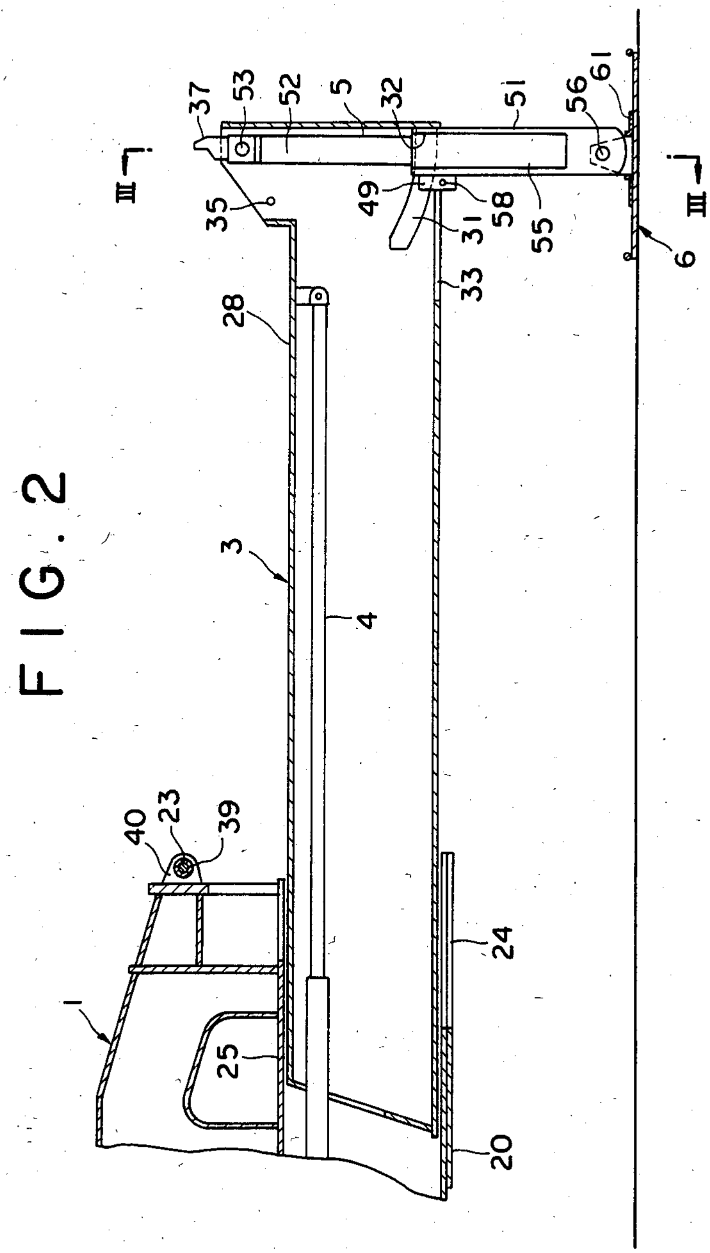
FIG. 2 is a front view, in longitudinal section, of said first embodiment in its operative position.
Figure 3:
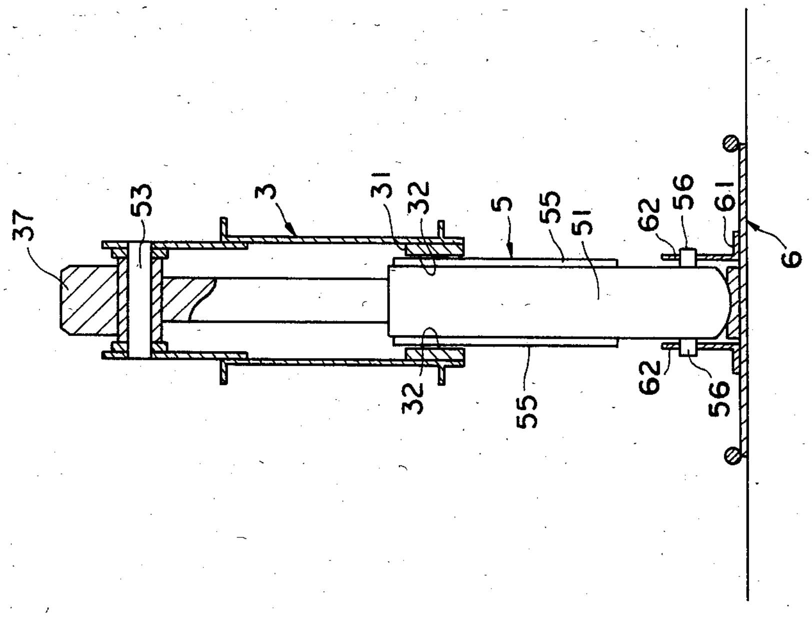
FIG. 3 is an enlarged section taken along the line III—III in FIG. 2.

In such arrangement, when the outrigger is used, the extensible beam 3 is extended outwardly laterally of the machine and the jack cylinder 5 is vertically extended, as shown in FIGS. 2 and 3, to bring the float 6 into contact with the ground while floating the machine so as to be ready for various types of work. In this case, since the projections 55 on the cylinder tube 51 engage the engaging recesses 32 of the guides 31 on the extensible beam 3, as described above, the jack cylinder 5 is locked in its vertical position and is thereby prevented from swaying or toppling during operation.

When it is desired to store the outrigger, the jack cylinder 5 is contracted to disengage said projections 55 from the engaging recesses 32 and then the extensible beam 3 is drawn into the fixed box 2 for storage therein. In this case, immediately before the extensible beam 3 is completely stored in the fixed box 2, the projection 37 on the upper end of the jack cylinder abuts against the pusher pin 39, so that on that portion of the stroke which starts with this abutment and ends with completion of extensible beam storage, the projection 37 is pushed by the pusher pin 39 outwardly laterally of the machine, whereby the jack cylinder 5 is swung toward the extensible beam 3 around the axis of the pin 53, until it is stored in its inclined position in the beam 3, as shown in FIG. 1. The float 6 comes in intimate contact with the lower surface of the fixed box 2 while maintaining its horizontal position. Although the jack cylinder 5 is firmly held in its inclined stored position by the abutting action between the projection 37 and the pusher pin 39, as described above, this embodiment makes this even more certain by inserting a locking pin 97 into a locking hole 58 formed in a bracket 49 mounted on the upper portion of the cylinder tube of the jack cylinder 5 and into a locking hole 35 formed in the front end of the extensible beam, thus doubly locking the jack cylinder in its inclined stored position.

According to this outrigger device adapted to draw the jack cylinder 5 toward the extensible beam 3 while turning it around the axis of the pivot at its upper end until it is stored in its inclined position in said beam 3 when the device is not used, as described above, it is seen that when the jack cylinder 5 is brought to its vertical position to be ready for operation, said cylinder 5 causes the extensible beam 3 to project downwardly or, in other words, the jack cylinder 5 can be projected downwardly of the machine to reduce the distance from the ground, so that the cylinder 5 is required to have shorter stroke for floating the machine than in the conventional outrigger device. Thus, the overall length of the jack cylinder can be reduced by the amount corresponding thereto. Thus, according to the outrigger device of the invention, the combined effects of (1) the capability of reducing the overall length of the jack cylinder 5 and (2) the capability of projecting the cylinder 5 downwardly of the machine enables the amount of projection of the jack cylinder 5 above the machine to be greatly reduced as compared with the conventional device. As a result, there is no possibility of the jack cylinder 5 interfering with pile driving and other proximity work, as in the past, this being very advantageous from the standpoint of doing work.

On the other hand, in the outrigger storage state, since the float 6 together with the jack cylinder 5 is drawn toward the extensible beam 3 until it is completely received on the lower surface of the fixed box 2, that is, since the float 6 does not project outwardly laterally of the machine, it is no longer necessary to remove the float 6 from the jack cylinder 5 each time the machine travels on a highway, as in the past. Further, this elimination of the requirement of mounting and dismounting the float means that it is not necessary to reduce the weight of the float, thus making it possible to increase the size of the float within the range where the float does not project outwardly laterally of the machine, so that the stability of the machine support can be increased.

Further, in the present device, since the positional change of the jack cylinder 5 is effected in such a manner that its change to the vertical position is effected by its own weight and its change to the inclined stored position is effected by the abutting action between the projection 37 on the cylinder 5 and the pusher pin 39 on the fixed box 2, it is not necessary to provide a hydraulic cylinder or other exclusive-purpose drive source for the positional change of the jack cylinder 5. Accordingly, the related construction is very simple, the cost is low, and extra operations are not required.

Figure 4:
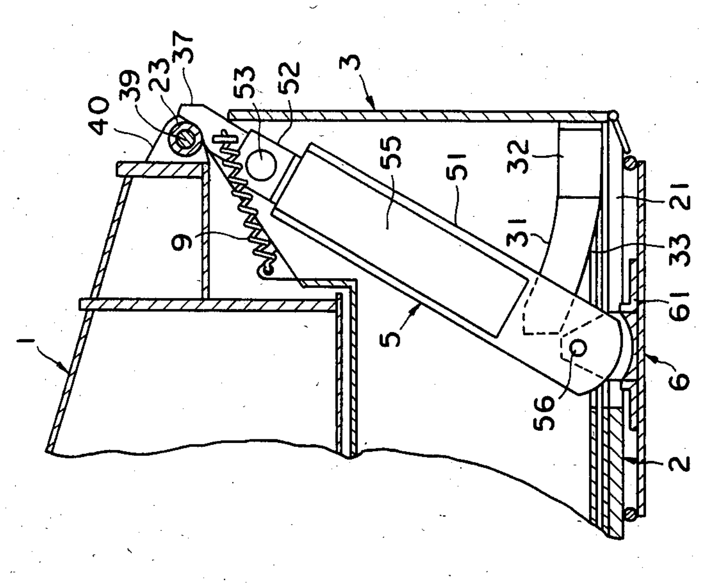
FIG. 4 is an enlarged fragmentary front view, in longitudinal section, of a second embodiment of the invention.

In this connection it is to be noted that although the positional change of the jack cylinder 5 from its inclined stored position to its vertical position can be positively effected by the weight of said cylinder 5, measures may be taken to provide against such a rare possibility as the rusting of the pivot around which the cylinder swings, as shown in FIG. 4, by providing a tension coil spring 9 stretched between the projection 37 on the jack cylinder 5 and the extensible beam 3, which spring 9 facilitates the weight-dependent positional change of the jack cylinder 5 to its vertical position, thereby further increasing the reliability of operation. Further, the locking means for locking the jack cylinder 5 in its vertical position is not limited to the one shown in this embodiment. For example, locking pins adapted to resiliently pop in and out may be installed on the transversely opposite surfaces of the front end portion of the extensible beam 3 so that they may be automatically engaged in locking holes formed in the jack cylinder 5. Alternatively, a locking pin may be manually inserted into locking holes formed in the jack cylinder 5 and extensible beam 3. Further, in the above embodiment, while the jack cylinder 5 is installed at the front end of the extensible beam, with the cylinder tube 51 oriented downwardly, it may, of course, be installed so that the cylinder tube 51 is oriented upwardly, as in the past. However, according to the above embodiment, since the rod 52 is hidden in the extensible beam 3, possible damage to the rod 52 and incidental oil leakage and malfunctioning can be excluded, and it is only necessary to apply machining and other operations for locking means to the cylinder tube 51, so that these operations are easy to perform.

As described above, according to the invention, because of the arrangement wherein during outrigger storage, the jack cylinder is drawn toward the beam while turning around the axis of the pivot at its upper end until it is stored in its inclined position in the beam, the amount of projection of the jack cylinder above the machine can be reduced as compared with the conventional device, which is advantageous to pile driving and other proximity work. Further, since the float can be received within the machine width, it is no longer necessary to remove the float for each trip on a highway, thus allowing the float diameter to be increased so as to improve safety during outrigger operation.

Further, according to the invention, the positional change of said jack cylinder to its inclined stored position is automatically effected by the abutting action between the projection on the upper end of said cylinder and the fixed box without using any special drive source, while the change from this inclined stored position to the vertical position is effected by the weight of the cylinder. Thus, the construction is simple, the cost is low, and extra operations are unnecessary. Trouble-free operation and increased durability are accordingly ensured.

FIGS. 5 through 9 show another embodiment of the invention. In these figures, an extensible cylinder 4 has a cylinder tube 41 whose proximal end is pivotally connected to the inner surface of a fixed box 2 by a horizontal shaft 42 extending transversely of the traveling body, so that said cylinder 4 is swingable in a vertical plane with respect to the fixed box 2. The front end of the rod 43 of said extensible cylinder 4 is pivotally connected to a link 54 extending from the jack cylinder 5 by a horizontal shaft 44 likewise extending transversely. In this manner the extensible cylinder 4 and jack cylinder 5 are interlocked so that in the early stage of extension of the extensible cylinder 4, said cylinder 4 pushes the jack cylinder 5 outwardly laterally of the extensible beam while downwardly turning around the axis of the horizontal shaft 42, while in the early stage of contraction of the extensible cylinder 4, said cylinder 4 pulls the jack cylinder 5 inwardly laterally of the extensible beam while turning it upwardly around the axis of the horizontal shaft 42. In addition, the inner surface of the extensible beam 3 has fixed thereto on one or both of the transversely opposite sides thereof a stop or stops 17 against which a projection or projections 37 formed on one or both of the transversely opposite sides of the rod end of the jack cylinder 5 will abut when the jack cylinder 5 assumes its vertical position. Thus, the extension thrust of the extensible cylinder 4 will act directly on the extensible beam 3 from the time the jack cylinder 5 assumes its vertical position.

Reference will now be made to locking means for locking the jack cylinder 5 in its vertical position.

Projections 55 are provided on the transversely opposite sides of the cylinder tube 51 of the jack cylinder 5, extending from the upper end of said tube to a region close to the lower end. Each projection 55 is stepped so that its outer half 55*a* disposed adjacent the machine width projects to a greater extent than its inner half 55*b* (said outer half 55*a* and said inner half 55*b* being hereinafter referred to as the high land and the low land, respectively). On the other hand, blocks 34 and 63 are fixed to the transversely opposite surfaces of the front end portion of the extensible beam 3 and engaging recesses 32 are defined between said blocks 34 and 63. The engaging recesses 32 are so positioned that they will underlie the high lands 55*a* of the projections 55 on the jack cylinder 5 when said cylinder 5 assumes its vertical contracted position, the width of said recesses being such that the recesses are engageable by the high lands 55*a*. Thus, when the jack cylinder 5 is extended in its vertical position, the high lands 55*a* of the projections 55 will enter the engaging recesses 32 from above and engage the same.

A construction for holding the jack cylinder 5 in its vertical contracted position will now be described.

Figure 8:
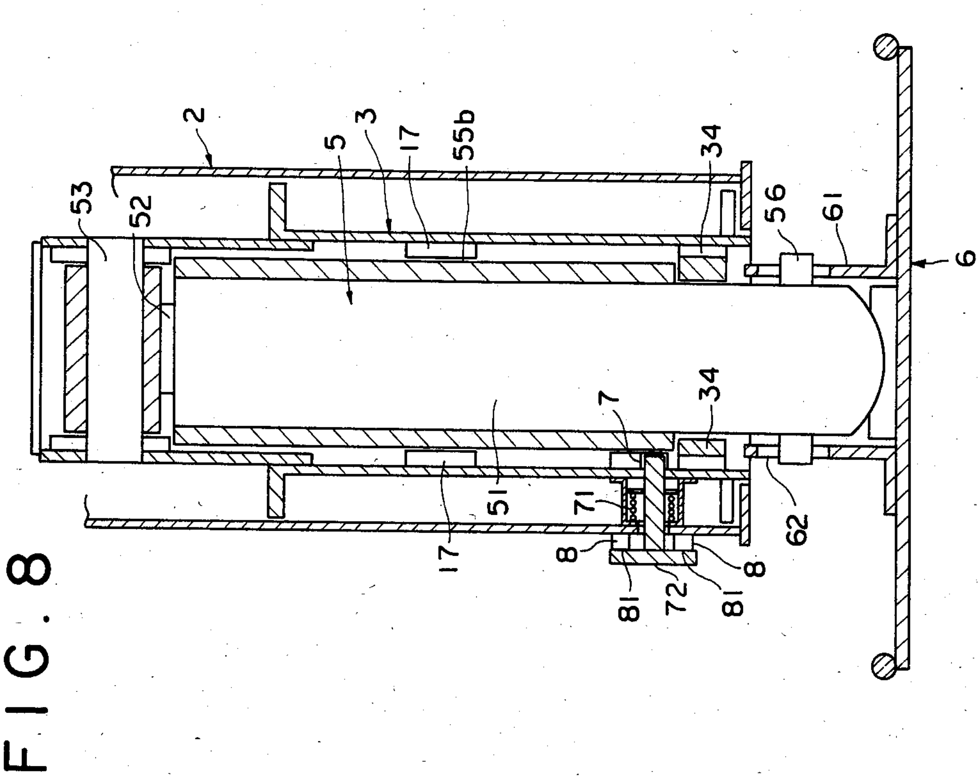
FIG. 8 is a section taken along the line VIII—VIII in FIG. 7.
Figure 7:
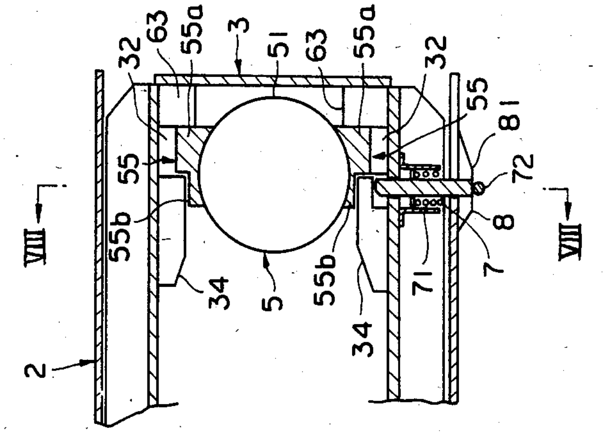
FIG. 7 is an enlarged section taken along the line VII—VII in FIG. 6.

As shown in FIGS. 7 and 8, a locking pin 7 is installed in one of the transversely opposite lower surface regions of the front end portion of the extensible beam 3 through a compression coil spring 71 so that it is capable of resiliently entering and withdrawing from the extensible beam 3. The end of the locking pin 7 projecting outside the extensible beam 3 is formed with a vertically extending long head 72, which engages the outer surfaces of a pair of cams 8 vertically spaced a predetermined distance apart from each other and fixed on the lower outer surface region of the front end portion of the fixed box 2. The outer surface of each cam is formed with an inclined surface 81 downwardly sloping toward the front end of the fixed box 2. As the extensible beam 3 extends, the head 72 of the locking pin 7 slides along the cam surfaces 81, causing the locking pin 7 to project into the extensible beam 3 until the front end of said locking pin 7 abuts against the low land 55*b* of the associated projection 55 on the jack cylinder 5, which is in its vertical contracted position. This abutting engagement of the locking pin 7 with the projection low land 55*b* prevents the jack cylinder 5 in its vertical contracted position from swinging inwardly of the extensible beam.

Figure 5:
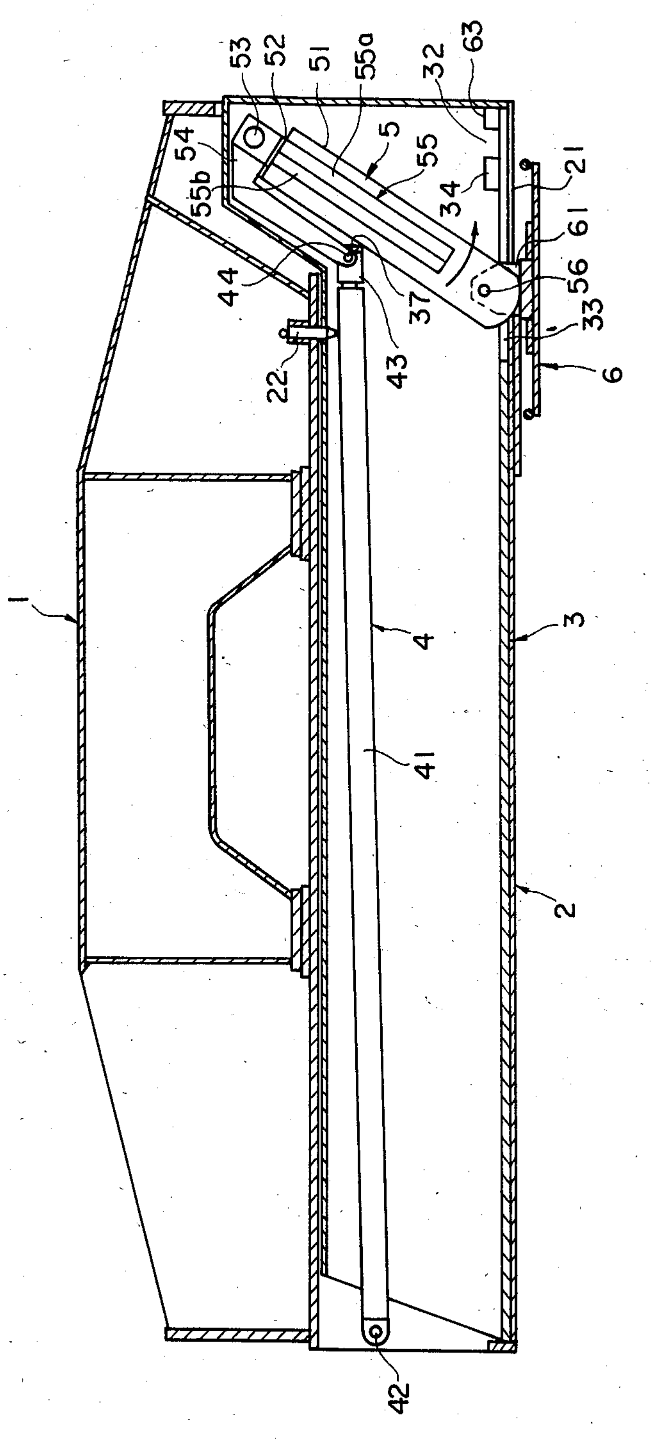
FIG. 5 is a front view, in longitudinal section, of a third embodiment of the invention, showing a jack cylinder in its stored position.

In addition, notches 21 and 33 are formed in the front lower surface regions of the fixed box 2 and extensible beam 3 to allow for swinging movement of the jack cylinder 5. In FIG. 5, numeral 22 denotes a locking pin for locking the extensible beam 3 in the stored state.

The float 6 is installed for swinging movement longitudinally of the machine by pins 56 projecting from transversely opposite sides of the lower end of the cylinder tube 51 of the jack cylinder 5 and received in elongated openings 62 (FIG. 8) formed in float attaching seats 61.

The functioning of the device will now be described.

Figure 9:
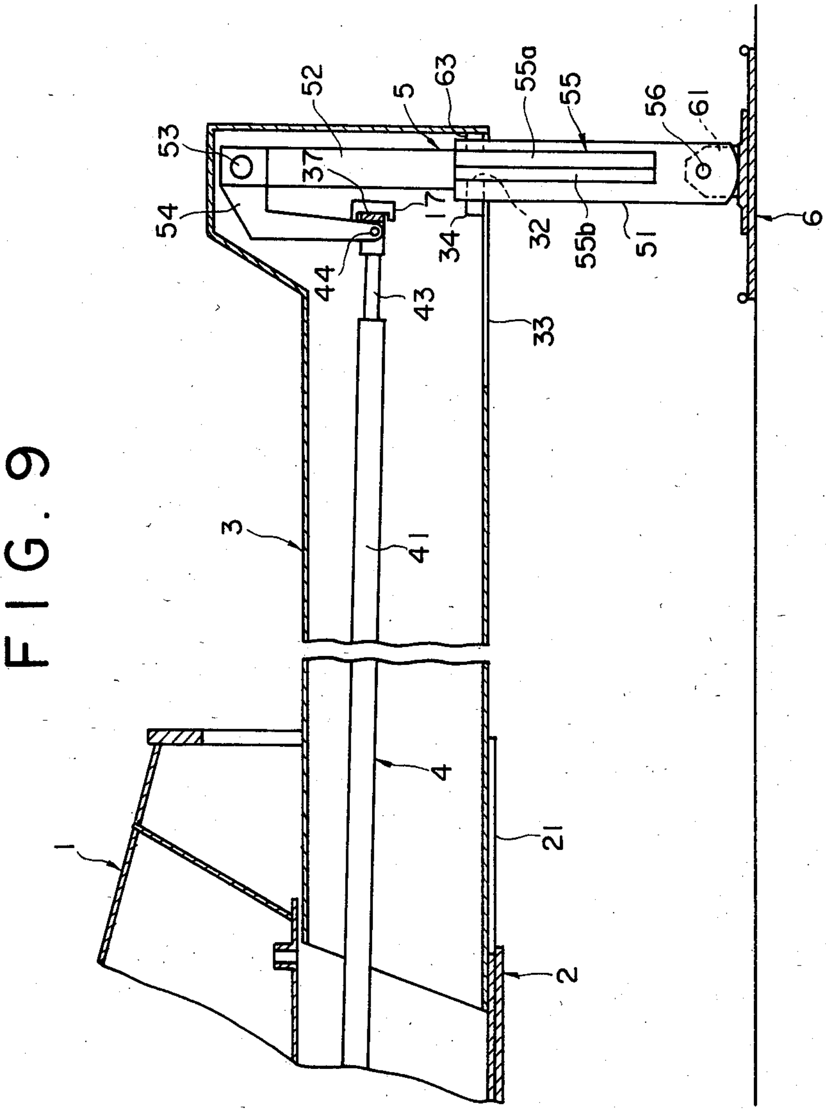
FIG. 9 is a front view, in longitudinal section, of the device in its operative position.

When the outrigger is used, the extensible cylinder 4 is extended from the state shown in FIG. 5 to cause the extensible beam 3 to extend outwardly laterally of the machine, as shown in FIG. 9, and then the jack cylinder 5 is extended in its vertical position to contact the float with the ground to thereby float the machine to be ready for various types of work.

Thus, in the extensible beam storage state, the jack cylinder 5 is in the illustrated inclined stored position. When the extensible cylinder 4 begins to extend to cause extension of the extensible beam 3, said cylinder 4 turns downwardly around the axis of the horizontal shaft 42 while pushing the link 54 of the jack cylinder 5 by the rod 45. As a result, the jack cylinder 5 is turned around the axis of the horizontal pin 53 to assume its vertical position, whereupon the extending force of the extensible cylinder 4 is applied to the extensible beam 3 through the stops 17, thereby starting extension of said beam 3.

In addition, the arrangement for transmitting the extending force of the extensible cylinder 4 to the extensible beam 3 from the time the jack cylinder 5 assumes its vertical position, as in this embodiment, is more advantageous than an arrangement wherein the extending force is transmitted to the extensible beam 3 through the jack cylinder 5 continuously even after the jack cylinder 5 assumes its vertical position, from the standpoint of protection of the jack cylinder 5 since the high extending force does not act on the cylinder 5.

When the jack cylinder 5 assumes its vertical position, as described above, the front end of the locking pin 7 is opposed to the low land 55*b* of the projection 55 on the jack cylinder 5, as shown in FIGS. 7 and 8, and as the extensible beam 3 extends, said locking pin 7 projects into the extensible beam 3 under the guiding action of the cam surfaces 81 of the cams 8 provided on the fixed box, until it abuts against the low land 55*b*, as described above. This prevents the jack cylinder 5 from fluctuating during movement of the extensible beam 3.

Upon completion of extension of the extensible beam, the jack cylinder 5 is extended to bring the high lands 55*a* of the projections 55 into engagement with the engaging recesses 32 formed in the inner surface of the extensible beam 3, whereby the cylinder 5 is locked in its vertical extended position and thereby prevented from swaying or toppling during operation.

Now, when it is desired to store the outrigger, the jack cylinder 5 is contracted to disengage the high lands 55*a* from the engaging recesses 32, and in this state the extensible beam 3 is drawn into the fixed box 2 for storage therein. At the start of extensible beam storage, since the jack cylinder 5 is pulled inwardly laterally of the extensible beam as a result of contraction of the extensible cylinder 4, the jack cylinder 5 automatically swings for a change from its vertical to inclined storage position, whereupon storage of the extensible beam 3 is started. At this instant, the float 6 comes in intimate contact with the lower surface of the fixed box 2, being held horizontal.

According to this outrigger device arranged so that the jack cylinder 5 is stored in its inclined state in the extensible beam 3 at the time of outrigger storage, as described above, when the jack cylinder 5 is brought to its vertical position to be ready for operation, said cylinder 5 projects downwardly of the extensible beam 3 or, in other words, the jack cylinder 5 is projected downwardly to reduce the distance from the ground, so that the required stroke for said cylinder to float the machine is reduced as compared with the conventional device. Thus, the overall length of the jack cylinder 5 can be reduced by a corresponding amount. Further, since the jack cylinder 5 is adapted to be projected in its vertical position downwardly of the machine, the amount of projection of said cylinder above the machine can be correspondingly reduced.

Therefore, according to the present device, since the positional change of the jack cylinder 5 between the vertical position and the inclined stored position automatically and forcibly is effected by utilizing the extension and contraction of the extensible cylinder 4, the reliability of the positional change of the jack cylinder is high and there is no need to perform extra operations. Further, since the extensible cylinder 4 is attached to the fixed box 2 and interlocked with the jack cylinder 5 so that it may swing in operative association with the jack cylinder 5, the construction is simpler than a construction wherein an unswingable extensible cylinder and a swingable jack cylinder are interlocked to each other through an intermediate transmission mechanism, such as a link mechanism. Also there is no danger of causing troubles, such as the positional change of the jack cylinder 5 being unnecessarily accelerated by the accelerating action of such intermediate transmission mechanism.

According to the embodiment described above wherein the jack cylinder 5 is attached to the front end of the extensible beam so that the cylinder tube 51 is oriented downwardly and the rod 52 is oriented upwardly, which is reverse to the conventional positioning, it will be understood that since the rod 52 is hidden in the extensible beam 3, likelihood of damage to the rod and incidental oil leakage and malfunction can be avoided and machining of the locking means, etc., to be applied to the cylinder 5 may be applied to the cylinder tube 51, so that such machining is easy to perform. In the present invention, however, the jack cylinder 5 may be installed with the cylinder tube 51 oriented upwardly, as in the conventional arrangement. In such case, the extensible cylinder 4 will be connected to the cylinder tube 51 of the jack cylinder 5. The two components 4 and 51 may be directly pivotally connected together without using a link such as the link 54 in the above embodiment.

The locking means for locking the jack cylinder 5 in its vertical extended position is not limited to the above embodiment. For example, locking pins adapted to resiliently move in and out may be provided in the transversely opposite surfaces of the front end portion of the extensible beam 3 so that said locking pins may be automatically engaged in locking holes formed in the jack cylinder 5. Alternatively, a locking pin may be manually inserted into locking holes formed in the jack cylinder 5 and extensible beam 3.

Figure 6:
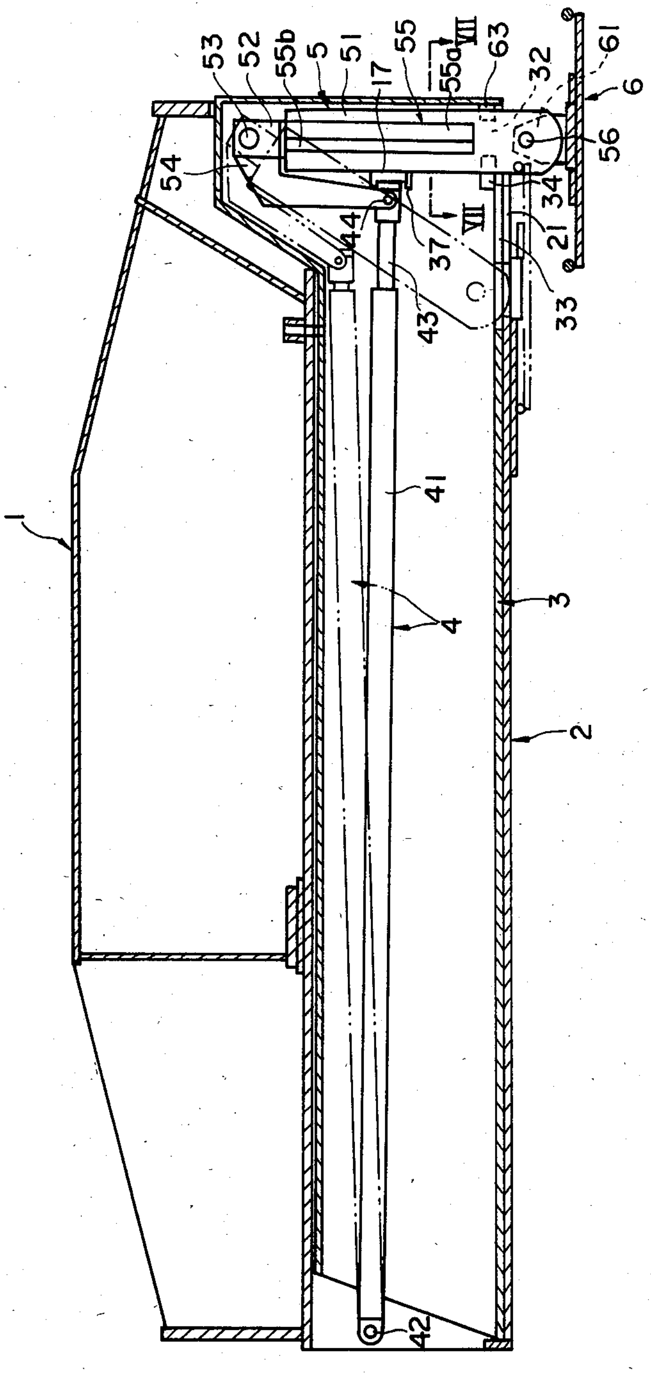
FIG. 6 is a front view, in longitudinal section, of said embodiment in its operative position with the jack cylinder brought to its vertical position.
Figure 10:
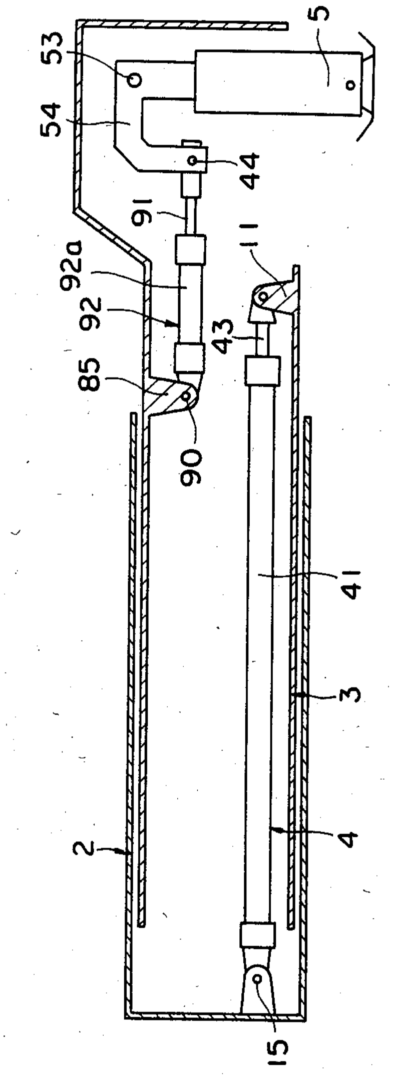
FIG. 10 is a front view, in longitudinal section, of a fourth embodiment of the invention, showing a jack cylinder in its vertical position.

Referring to FIG. 10 showing another embodiment of the invention, an auxiliary extensible cylinder 92 has a cylinder tube 92*a* pivotally connected at its distal end to an intermediate surface region 85 of an extensible beam 3 by horizontal shaft 90 extending transversely of the traveling body, whereby the cylinder 92 is attached to the extensible beam 3 so that it is swingable in a vertical plane. The front end of the rod 91 of the auxiliary cylinder 92 is pivotally connected to a link 54 projecting from a jack cylinder 5 by a horizontal shaft 44 likewise extending transversely. That is, the auxiliary extensible cylinder 92, which has exactly the same functioning as that of the extensible cylinder 4 associated with the jack cylinder 5 of FIG. 6, is pivotally connected at 90 to the inner surface region 85 located intermediate the ends of the extensible beam 3 and nearer to the jack cylinder. The extensible cylinder 4 is connected at the distal end of its cylinder tube 41 to a fixed point 15 on the inner surface of the fixed box 2 and is connected to a connecting rod 11 disposed at the end of the rod 43 of the cylinder nearer to the jack cylinder 5, the arrangement being such that the extending thrust of the rod 43 of the extensible cylinder 4 acts directly on the extensible beam 3 from the time the jack cylinder 5 assumes its vertical position under the thrust of the auxiliary extensible cylinder 92, thereby effecting extension of the extensible beam 3.

With the arrangement thus made, the auxiliary extensible cylinder 92 serves to effect only the positional change of the jack cylinder 5 from its vertical to stored position and vice versa, while the extensible cylinder 4 serves to effect only the extension of the extensible beam 3. Therefore, part of the extension of the extensible cylinder compensates for the amount consumed for the positional change of the jack cylinder to its vertical position, thereby making it possible to further extend the extensible beam. The large diameter of the outrigger device is particularly effective in increasing the stability of the machine frame.

Figure 11:
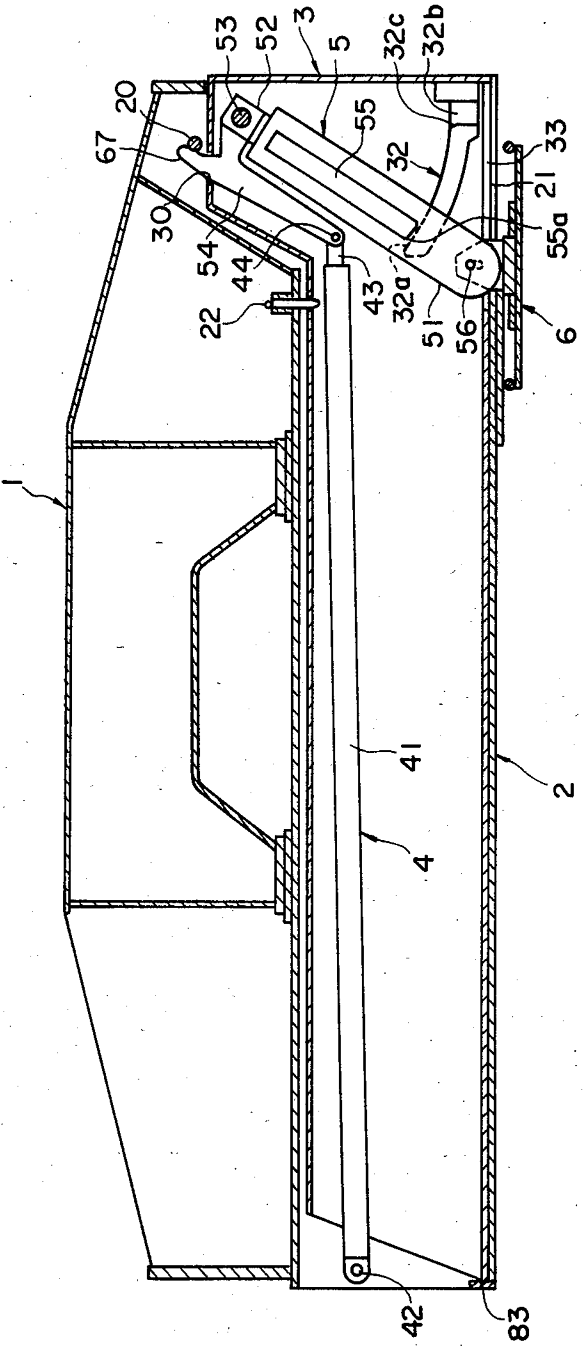
FIG. 11 is a front view, in longitudinal section, of a fifth embodiment, showing the jack cylinder in its stored position.
Figure 12:
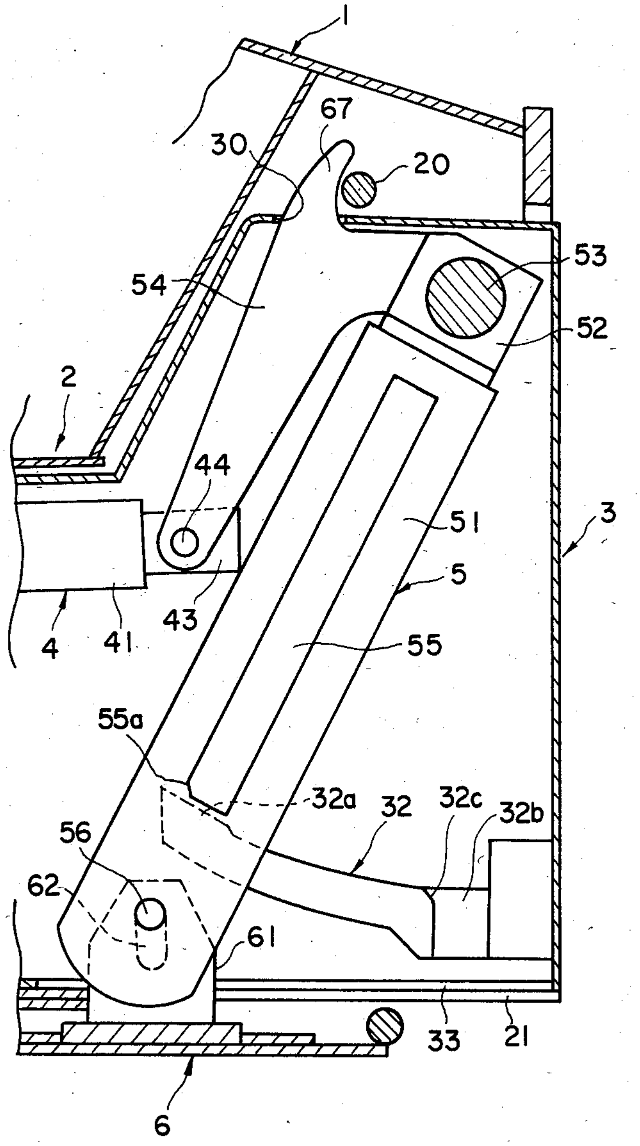
FIG. 12 is a fragmentary enlarged view of fifth embodiment.
Figure 13:
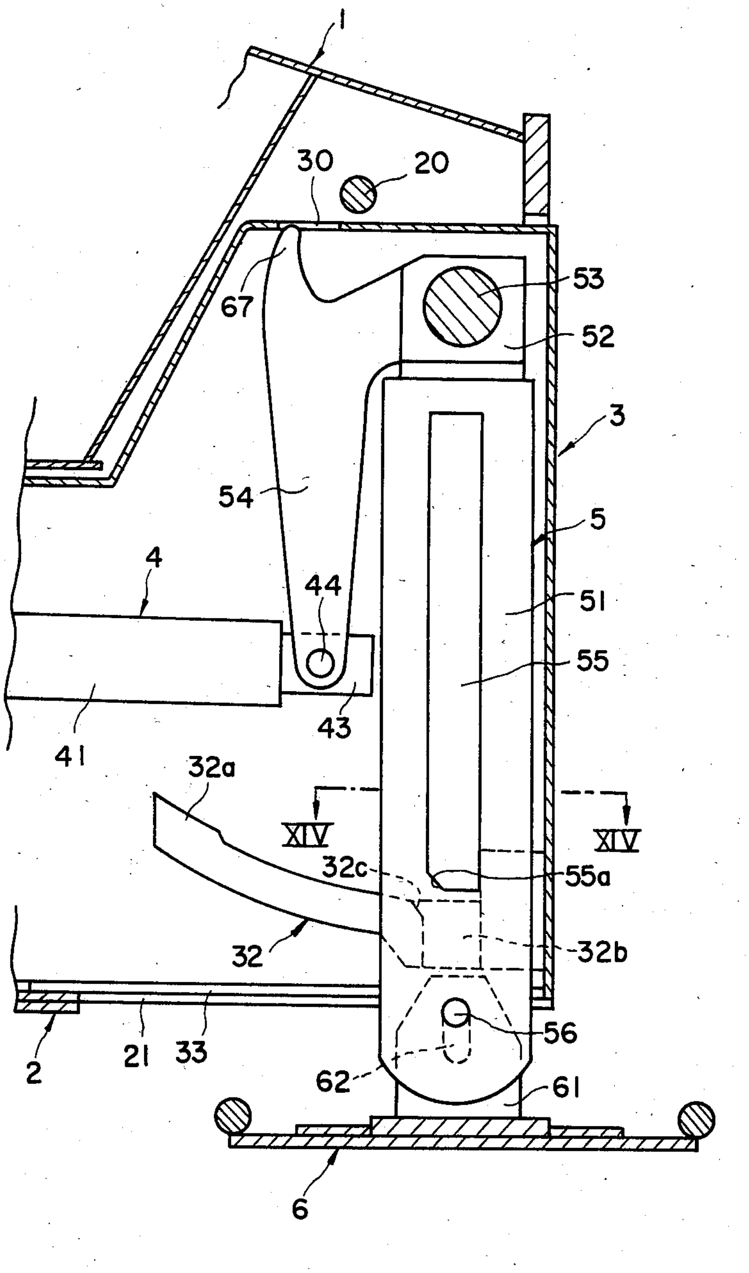
FIG. 13 is a view corresponding to FIG. 12, with the jack cylinder moved to its vertical position in operation.

Referring to FIGS. 11 through 17 showing another embodiment of the invention, a jack cylinder 5 is installed at the front end of an extensible beam 3, with a cylinder tube 51 oriented upwardly and a rod 52 oriented downwardly, which is reverse to the conventional positioning, the rod end being pivotally connected to the extensible beam 3 by a horizontal pin 53 extending transversely of the machine. Thus, the jack cylinder 5 is attached to the front end of the extensible beam so that it is swingable around the axis of the pivot at its upper end longitudinally (widthwise) of the machine. At the time of outrigger storage, the cylinder 5 is drawn from its vertical position inwardly laterally of the extensible beam 3 while turning around the axis of the pivot at its upper end until it is stored in its inclined position in said beam 3, as shown in FIG. 11. The jack cylinder 5 is provided with a link 54 projecting downwardly from the upper end of said rod, the lower end of said link 54 being pivotally connected to the front end of the rod 43 of the extensible cylinder 4 by a transversely extending horizontal shaft 44. Thus, the extensible cylinder 4 and jack cylinder 5 are interlocked to each other so that in the early stage of extension of the extensible cylinder 4, said cylinder 4 pushes the jack cylinder 5 outwardly laterally of the extensible beam while turning downwardly around the axis of the horizontal shaft 42, while during contraction of the extensible cylinder 4, conversely, said cylinder 4 pulls the jack cylinder 5 inwardly laterally of the extensible beam while turning upwardly around the axis of the horizontal shaft 42.

The upper end of the link 54 at the jack cylinder 5 is integrally formed with a locking arm 67 extending through an opening 30 in the front upper surface region of the extensible beam 3 to enter the front end portion of the fixed box 2 with the extensible beam in its stored position. In the front end portion of the fixed box 2 which said locking arm 67 enters, there is fixed a transversely extending horizontal locking rod 20, so that when the jack cylinder 5 assumes its inclined stored position, said locking arm 67 engages said locking rod 20 in the beam extensioning direction, but when the jack cylinder 5 is turned into its vertical position, the locking arm 67 is disengaged from the locking rod 20. With this arrangement, unless the jack cylinder is moved from its inclined stored to vertical position, the engagement between the locking arm 67 and the locking rod 20 holds the extensible beam 3 fixed by the fixed box 2, preventing its extension.

Engaging projections 55 are provided on the transversely opposite sides of the cylinder tube 51 of the jack cylinder 5, extending from the upper end of said tube to a region close to the lower end. The transversely opposite inner surfaces of the front end portion of the extensible beam 3 are provided with guide projections 32 along the path of movement described by the lower end surfaces of said projections 55 during swinging movement of the jack cylinder 5. Each guide projection 32 has at its initial end (nearer to the inner lateral end of the beam) a stop portion 32*a* which is located adjacent opposed relation to the lower end surface of the associated engaging projection 55 when the jack cylinder 5 is stored in its inclined position, so that if the jack cylinder 5 in its inclined stored position is extended by mistake, the engaging projections 55 strike the stop portions 32*a* to thereby prevent extension of the jack cylinder 5. The guide projection is provided with an engaging recess 32*b* adjacent the terminal end thereof. The engaging recesses 32*b* are so positioned that they are opposed to the engaging projections 55 on said jack cylinder 5 when the latter assumes its vertical extended position, the width of said engaging recesses being such that they are engageable by said projections 55. Thus, when the jack cylinder 5 is extended from its vertical contracted position, the engaging projection 55 will engage the engaging recesses 32*b* from above. In addition, to ensure reliable and smooth engagement of the engaging projections 55 with the engaging recesses 32*b*, the lower ends of said projections 55 and the upper open portions of said engaging recesses are formed with inclined guide surfaces 55*a* and 32*c*. In each guide projection 32, the terminal end portion including the engaging recess 32*b* may be formed separately from the remaining portion and removably attached to the latter as by bolts to enable replacement in case of wear.

Figure 15:
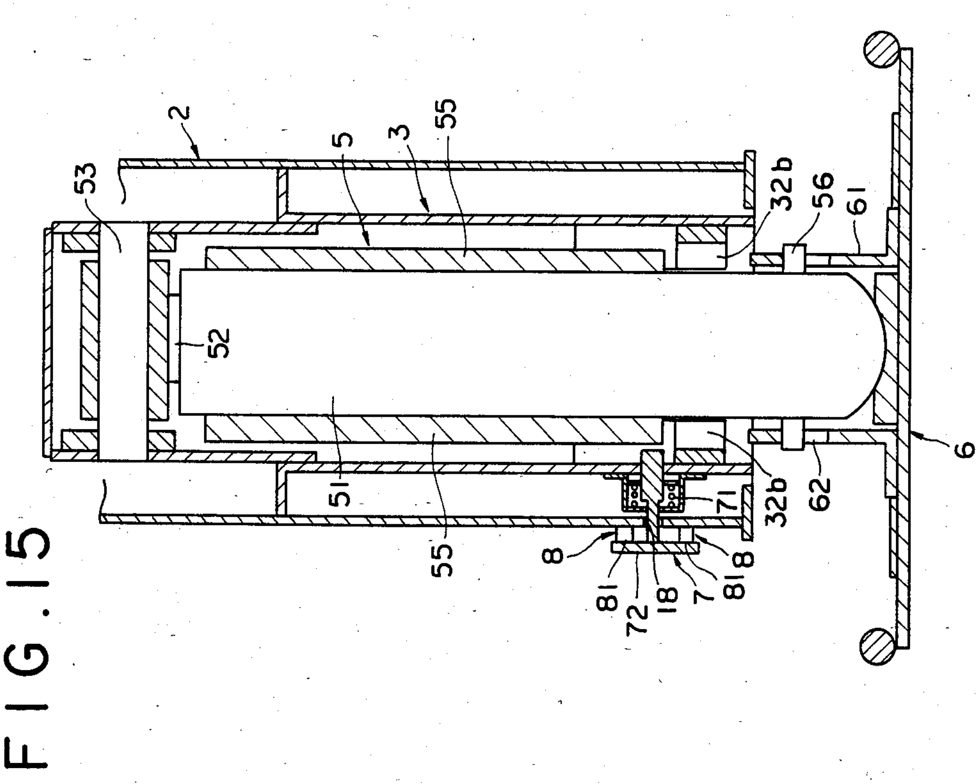
FIG. 15 is a section taken along the line XV13 XV in FIG. 14.
Figure 14:
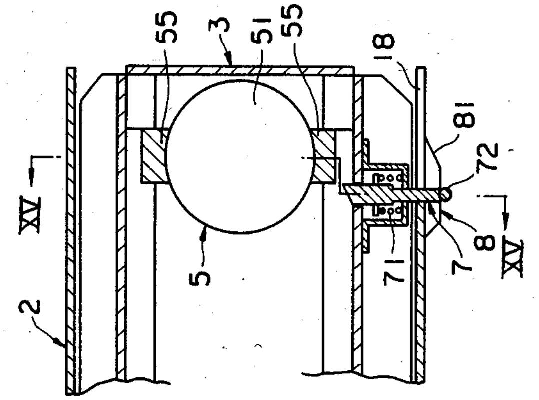
FIG. 14 is a section taken along the line XIV—XIV in FIG. 13.
Figure 16:
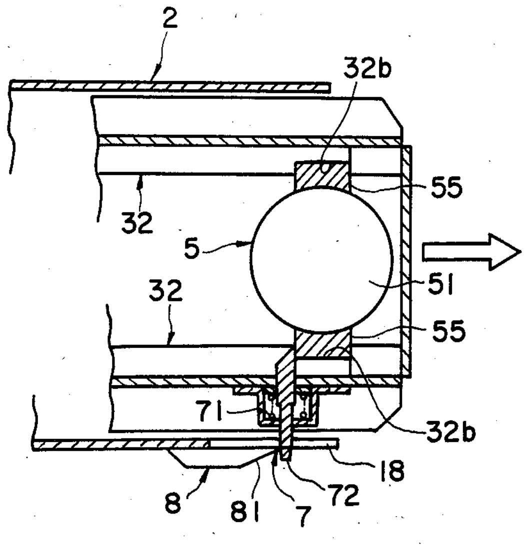
FIG. 16 is a view corresponding to FIG. 14, showing a position which an extensible beam assumes immediately after it starts to extend.

Reference will now be made to a jack cylinder locking mechanism for preventing the jack cylinder 5 from swinging in its vertical contracted position during extension of the extensible beam 3. As shown in FIGS. 14 through 16, a locking pin 7 is installed in one of the transversely opposite lower surface regions of the front end portion of the extensible beam 3 through a compression coil spring 71 so that it resiliently moves in and out of the extensible beam 3. The end of the locking pin projecting outside the extensible beam 3 is formed with a vertically elongated head 72, which engages the outer surfaces of a pair of cams 8 vertically spaced a predetermined distance apart from each other and fixed to the lower outer surface region of the front end portion of the fixed box 2. The outer surface of each cam is formed with an inclined cam surface 81 which, when seen in plan view, slopes downwardly toward the front end of the fixed box 2. Thus, as the extensible beam 3 moves during extension, the head 72 of the locking pin 7 slides along the cam surfaces 81 to thereby project the locking pin 7 into the extensible beam 3 until the front end of the locking pin 7 engages the lower lateral surface region of the associated engaging projection 55 on the jack cylinder 5 in its vertical contracted position. This engagement of the locking pin 7 with the lower lateral surface region of the engaging projection 55 prevents the jack cylinder 5 from swinging in its vertical contracted position inwardly laterally of the extensible beam. In addition, in FIGS. 14 through 16, numeral 18 denotes a groove for leading the locking pin head 72 into the outside of the fixed box 2. Further, the lower surface of the front end portions of the fixed box 2 and extensible beam 3 are formed with notches 21 and 33 to allow swinging movement of the jack cylinder 5. In FIG. 11, numeral 22 denotes a locking pin for locking the extensible beam 3 in its stored state.

The float 6 is swingably installed by pins 56 projecting from the transversely opposite sides of the lower end portion of the cylinder tube 51 of the jack cylinder 5 and inserted in elongated openings 62 formed in float attaching seats 61.

The operation of the present invention will now be described.

Figure 17:
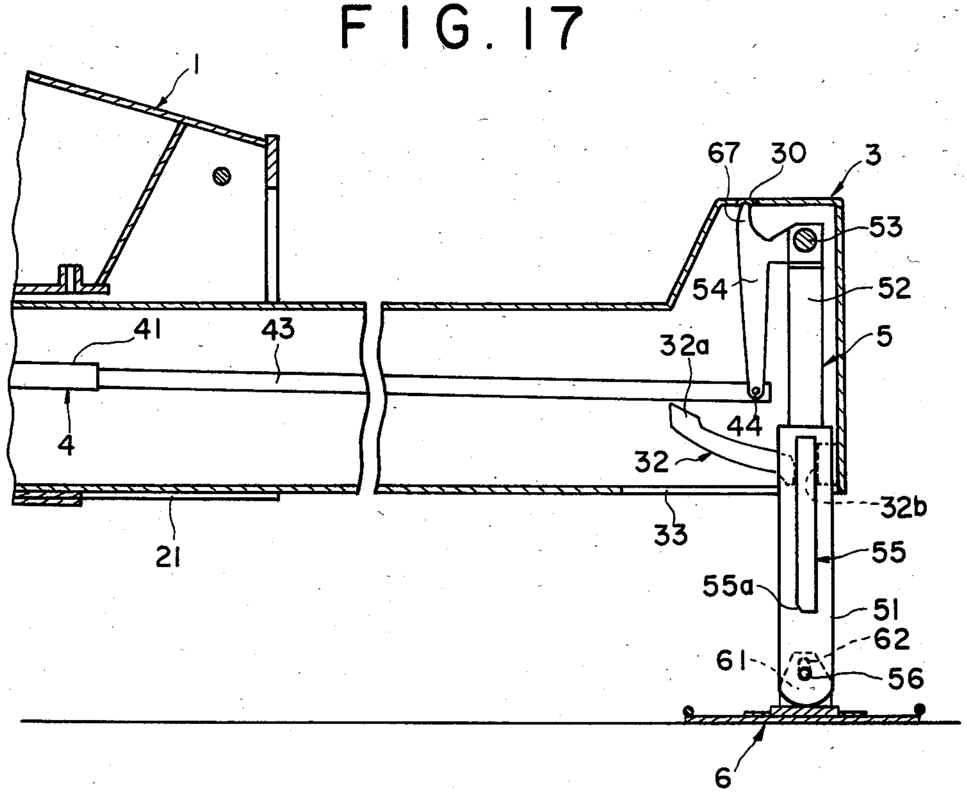
FIG. 17 is a front view, in longitudinal section, showing the extended position of an outrigger.

When the outrigger is used, the extensible cylinder 4 is extended from its state shown in FIG. 11 to extend the extensible beam 3 outwardly laterally of the machine, as shown in FIG. 17 and then the jack cylinder 5 is extended in a vertical direction to bring the float 6 into contact with the ground to lift the machine so as to be ready for various types of work.

Thus, in the extensible beam storage state, the jack cylinder 5 is in the illustrated inclined storage position. When the extensible cylinder 4 starts to extend so as to cause extension of the extensible beam 3, said cylinder 4, while turning downwardly around the axis of the horizontal shaft 42, as described above, pushes the link 54 of the jack cylinder 5 by the rod 43. As a result, the jack cylinder 5 is turned around the axis of the horizontal pin 53 to assume its vertical position, whereupon the extending force of the extensible cylinder 4 is applied to the extensible beam 3, starting extension of the beam 3.

On the other hand, when the jack cylinder 5 assumes its vertical position, as described above, the front and end of the locking pin 7 faces the lower lateral surface region of the engaging projection 55, as shown in FIGS. 14 and 15 and as the extensible beam 3 is moved for extension, the locking pin 7 is caused to project into the extensible beam 3 by the guiding action of the cam surfaces 81 of the cams 8 installed on the fixed box 2, until it engages the lateral surface of the engaging projection 55, as shown in FIG. 16. This prevents the jack cylinder 5 from swaying during movement of the entensible beam 3. There are situations where after the extensible beam 3 has been fully or almost fully extended, it is somewhat contracted to adjust the length. In such case, the positional change of the jack cylinder 5 to its inclined position can be prevented by said locking pin 7. For this reason, adjustment of the extension length can be quickly and smoothly complete.

Upon completion of extension of the extensible beam, the jack cylinder 5 is extended to cause the engaging projections 55 to engage the engaging recesses 32*b* of the guide projections 32 on the extensible beam 3, whereby the cylinder 5 is locked in its vertical extended position and prevented from swaying or toppling during operation.

When it is desired to store the outrigger, the jack cylinder 5 is contracted to disengage the engaging projections 55 from the engaging recesses 32*b* and then the extensible beam 3 is drawn into the fixed box 2 for storage therein. In the early stage of extensible beam storage, the contraction of the extensible cylinder 4 pulls the jack cylinder 5 inwardly laterally of the extensible beam, but the jack cylinder 5 is prevented from swinging by the locking pin 7. Therefore, during the beam storage stroke, the jack cylinder 5 is held in its vertical contracted position and the contracting force of the extensible cylinder 4 is transmitted to the extensible beam 3 through the jack cylinder 5 and locking pin 7.

Immediately before the end of the stroke for storing the extensible beam 3, the head 72 of the locking pin 7 slides along the cam surfaces 81 of the cams 8, thus pulling the locking pin 7 outwardly of the beam and releasing said pin 7 from the engaging projection 55 on the jack cylinder 5. Since this unlocks the jack cylinder 5, which is in its vertical position, the jack cylinder 5 is pulled by the extensible cylinder 4 from the time the storage of the extensible beam 3 is completed, automatically changing from its vertical to inclined position, finally assuming the state shown in FIG. 11. At this instant, the float 6 comes in contact with the lower surface of the fixed box 2 while it is horizontal.

The present device has the following merits concerning prevention of malfunctioning.

The first problem relates to malfunctioning of the jack cylinder. It is first presumed that at the start of extension of the outrigger, the jack cylinder 5 is extended due to mistake before the extending operation of the extensible beam 3. In this case, if the jack cylinder 5 is actually extended, this causes problems with the extension of the extensible beam 3 and subsequent operation, thus making it impossible to install the outrigger. According to the present device, however, in such case, since the engaging projections 55 on the jack cylinder 5 abut against the stop portions 32*a* of the initial end 32*a* of the guide projections 32 on the extensible beam 3, it is possible to prevent the jack cylinder 5 from extending by mistake.

But there may also be a situation where the extensible beam 3 is extended without the operator's knowledge of the situation where the engaging projections are pressed against the stop portions 32*a*. In this case, if the resisting force due to the forced contact between the engaging projections 55 and the stop portions 32*a* (hereinafter referred to simply as the resisting force) is lower than the beam extending thrust due to the extensible cylinder 4 (hereinafter referred to simply as the extending thrust), then the extending thrust overcomes the resisting force and forces the jack cylinder 5 to swing to its vertical position. In addition, said resisting force against the swing of the cylinder 5 includes rusting of the pivot around the axis in which it swings. To facilitate the forced swing of the jack cylinder 5, it is desirablc to decrease the length of contact between the engaging projections 55 and the guide projections 32 by making the upper surface level of the stop portions 32*a* somewhat higher than those of the other portions of the guide projections 32, as shown. What matters is a case where said resisting force is greater than the extending thrust, it being thought that the likelihood of occurrence of such case is high in connection with erroneous operation of the jack cylinder 5. In this case, the jack cylinder 5 becomes incapable of swinging and the extending thrust is transmitted to the extensible beam 3 through the jack cylinder 5. This situation would cause the extensible beam 3 to extend without the jack cylinder 5 swinging to its vertical position and make the operator mistakenly think that the outrigger installing operation has been completed, despite the fact that the jack cylinder 5 has not been extended. According to the present device, since the locking arm 67 formed on the top of the link 54 of said cylinder 5 is engaged with the locking rod 20 fixed to the fixed box 2 when the jack cylinder 5 is in its inclined stored position, if the jack cylinder 5 is incapable of swinging in its inclined stored position, as described above, the extending thrust applied to the jack cylinder 5 is transmitted to the fixed box 2 through the locking arm 67 and locking rod 20. Thus, the extensible beam 3 is fixed by the fixed box 2 and extension thereof is prevented from occurring. In addition, if the jack cylinder swings to its vertical position, the locking arm 67 is disengaged from the locking rod 20, as described above.

Thus, according to the present device, (1) the extension-preventing action remedies the situation where the jack cylinder 5 is extended by mistake when it is in its inclined stored position, (2) the cylinder forced-swinging action remedies the situation where some degree of resistance to swinging acts on the jack cylinder 5, and (3) the beam 3 extension-preventing action remedies the situation where the cylinder is incapable of swinging, thereby preventing malfunction of the outrigger so as to ensure the proper extending action.

In the above embodiment, the stop portions 32*a* for preventing extension of the jack cylinder 5 in its inclined stored position have been provided as part of the guide projections 32, but the stops 32 may be provided singly (i.e. separately), not as the guide projections. Further, according to the above embodiment wherein the jack cylinder 5 is installed with the cylinder tube 51 oriented downwardly and the rod 52 oriented upwardly, which is opposite conventional positioning, since the rod 51 is hidden in the extensible beam 3, the likelihood of damage to the rod 52 and incidental oil leakage and malfunctioning can be prevented and machining to be applied to the locking means, etc., may be applied to the cylinder tube 51, so that such machining is easy to perform. However, in the present invention, such may be installed with the cylinder tube 51 oriented upwardly, as in the conventional arrangement. Further, the locking means for locking the jack cylinder 5 in its vertical extended position is not limited to the above embodiment. For example, locking pins adapted to resiliently move in and out may be provided in the transversely opposite surfaces of the front end portion of the extensible beam 3 so that said locking pins may be automatically engaged in locking holes formed in the jack cylinder 5. Alternatively, a locking pin may be manually inserted into locking holes formed in the jack cylinder 5 and extensible beam 3.

As described above, according to the present device, since the jack cylinder and extensible beam are respectively provided with projections adapted to be opposed to each other axially of the jack cylinder when the latter is in its inclined stored position, which projections thus constitute a stop mechanism, it is possible to prevent extension of the jack cylinder when the latter is extended by mistake when it is in its inclined stored position. Further, if the jack cylinder is incapable of swinging, it is possible to prevent extension of the extensible beam by the engaging action between the locking arm provided on the jack cylinder and the locking rod provided in the fixed box, thereby ensuring proper outrigger extending operation and increasing the reliability of the device.

Figure 18:
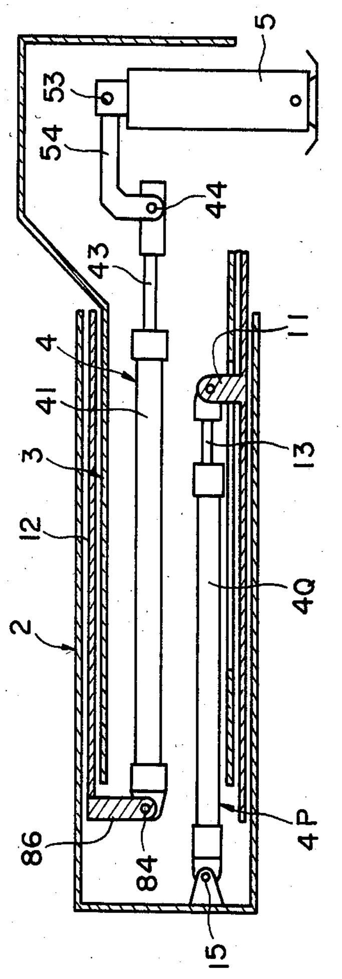
FIG. 18 is a front view, in longitudinal section, of another embodiment in its operative position with a jack cylinder brought to its vertical position.

Referring to FIG. 18 showing another embodiment of the invention, numerals 2, 3 and 12 denote extensible beams telescopically fitted together. Extensible cylinders 4 and 4P are provided for extending said extensible beams, and a jack cylinder 5 is swingably provided at the front end of the foremost beam 3. The extensible cylinder 4P has a cylinder tube 4Q fixed at its proximal end to the inner surface of a fixed box 2 at a fixed point 15, and a cylinder rod 13 connected at its front end to the outer extensible beam 12 by a connecting member 11.

The extensible cylinder 4 has a cylinder tube 41 pivotally connected at its proximal end to the inner surface 86 of the extensible beam 12 by a horizontal shaft 84 extending transversely of the traveling body, whereby the cylinder 4 is attached to the extensible beam 12 so that it is swingable in a vertical plane. The front end of the rod 43 of the extensible cylinder is pivotally connected to a link 54 projecting from the jack cylinder 5 by a transversely extending horizontal shaft 44. That is, the arrangement is such that the extensible cylinder 4 which was pivotally connected at 42 to the fixed box 2 in FIG. 6 is pivotally connected at 84 to the inner surface of the extensible beam 12, instead of being pivotally connected to the fixed box 2.

The thrust of the front extensible cylinder 4 moves the jack cylinder 5 to its vertical position, and then the extensible beam 3 starts to advance. Meanwhile, forward movement of the extensible cylinder rod 13 of the extensible cylinder 4P causes the extensible beam 12 connected thereto by the connecting member 11 to advance toward the front end. Meanwhile, the foremost beam 3 advances under the thrust of the rod 43 of the extensible cylinder 4 pivotally connected to the inner surface of the extensible beam 12. Therefore, the extensible beams 3 and 12 can be extended by the sum of the extent of forward travel of the cylinder rods 43 and 13. It is so arranged that said length of extension can be obtained by adjusting the amounts of forward travel of the cylinder rods 43 and 13.

Because of the arrangement described above, the amount of extension of the extensible beam assembly is greatly increased and the large inner diameter of the outrigger device is particularly effective in increasing the stability of the machine frame in the case of handling heavy objects.

Referring to FIGS. 19 through 23 showing a device according to another embodiment of the invention, an extensible cylinder 4 is connected at the proximal end of its cylinder tube 41 to the inner surface of a fixed box 2 and at the front end of its rod 43 to the front inner surface region of an extensible beam 3, so that extension and contraction of the extensible cylinder 4 enable the extensible beam 3 to be extended from and stored in the fixed box 2. In this case, the rod end of the extensible cylinder 4 and the extensible beam 3 are interconnected in the following manner.

A bracket 40 is fixed tothe rod end of the extensible cylinder 4, said bracket 40 being formed with an elongated opening 45 extending in the direction of extension and contraction of said cylinder. Further, a horizontal pin 29 extending transversely of the machine is fixed in the interior of the front end portion of the extensible beam 3, said pin 29 being inserted in the elongated opening 45 so that it is movable within the range of constant length. Thus, the rod 43 of the extensible cylinder 4 is connected to the extensible beam 3 so that within the range of constant length it is capable of extension and of free movement (lost motion) in the storing direction.

Further, a pin 56 extending transversly of the machine is fixed to the front end of the bracket 40 fixed to the rod end of the extensible cylinder 4, said pin 56 being engaged in an elongated opening 46 formed in a bracket 49 fixed to the outer surface of the cylinder tube 51 of the jack cylinder 5. The elongated opening 46 extends axially of the jack cylinder 5, and the extensible cylinder 4 and jack cylinder 5 are operatively interconnected through said elongated opening 46 and pin 56.

A mechanism for holding the jack cylinder 5 in its vertical contracted position will now be described.

Figure 21:
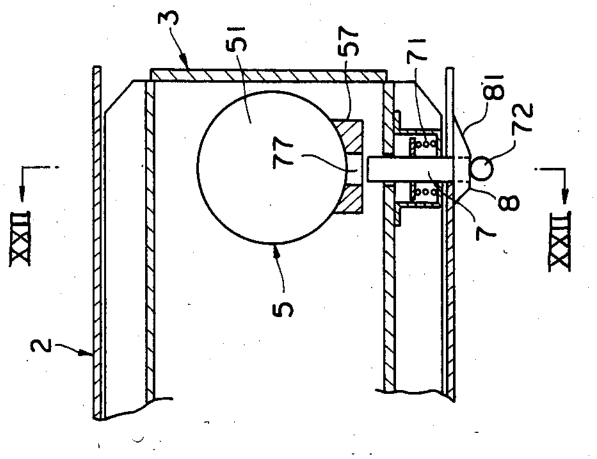
FIG. 21 is an enlarged section taken along the line XXI—XXI in FIG. 20.
Figure 22:
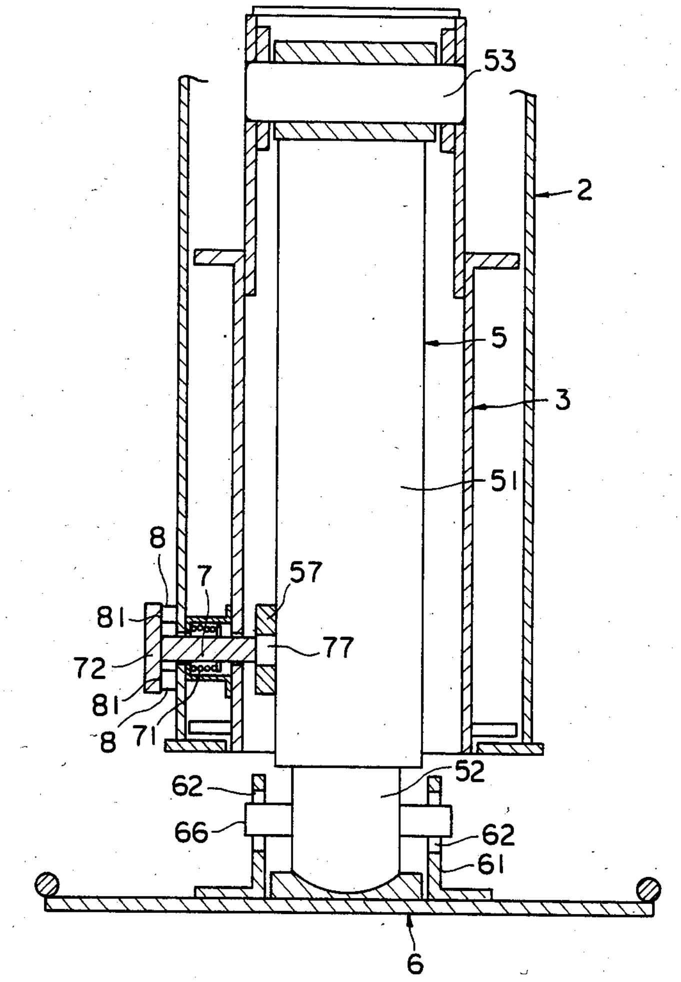
FIG. 22 is a section taken along the line XXII—XXII in FIG. 21.

As shown in FIGS. 21 and 22, a locking pin 7 is installed in one of the transversely opposite lower surface regions of the front end portion of the extensible beam 3 through a compression coil spring 71 so that it is capable of resiliently entering and leaving the extensible beam 3. The end of the locking pin 7 projecting outside the extensible beam 3 is formed with a vertically extending long head 72 engaged with the outer surfaces of a pair of cams 8 spaced a predetermined distance apart from each other and fixed to the lower outer surface region of the front end portion of the fixed box 2. The outer surfaces of the cams are each formed with an inclined cam surface 81 sloping downwardly toward the front end of the fixed box 2, so that as the extensible beam 3 extends, the head 72 of the locking pin 7 slides along the cam surfaces 81, causing the locking pin 7 to project into the extensible beam 3. Further, a locking plate 57 having a locking hole 77 is fixed to the region of the outer surface of the cylinder tube 51 of the jack cylinder 5 opposed to the locking pin 7, so that when the jack cylinder 5 assumes its vertical position, the locking pin 7 faces the locking hole 77 of the locking plate 57 and projects into the extensible beam until its front end engages the locking hole 77. This engagement of the locking pin 7 with the locking hole 77 prevents the jack cylinder 5 in its vertical contracted position from swinging inwardly laterally of the beam.

In addition, notches 21 are formed in the front lower surface regions of the fixed box 2 and extensible beam 3 to allow for swinging movement of the jack cylinder 5. Further, in FIG. 19, numeral 22 denotes a locking pin for locking the extensible beam 3 in its stored position, and 83 denotes a stop for defining the storage position of the beam 3. From the standpoint of safety it is desirable to provide the proximal end of the extensible beam 3 and the front end of the fixed box with stops (not shown) for limiting the amount of extension of said beam 3 to a constant value.

Figure 19:
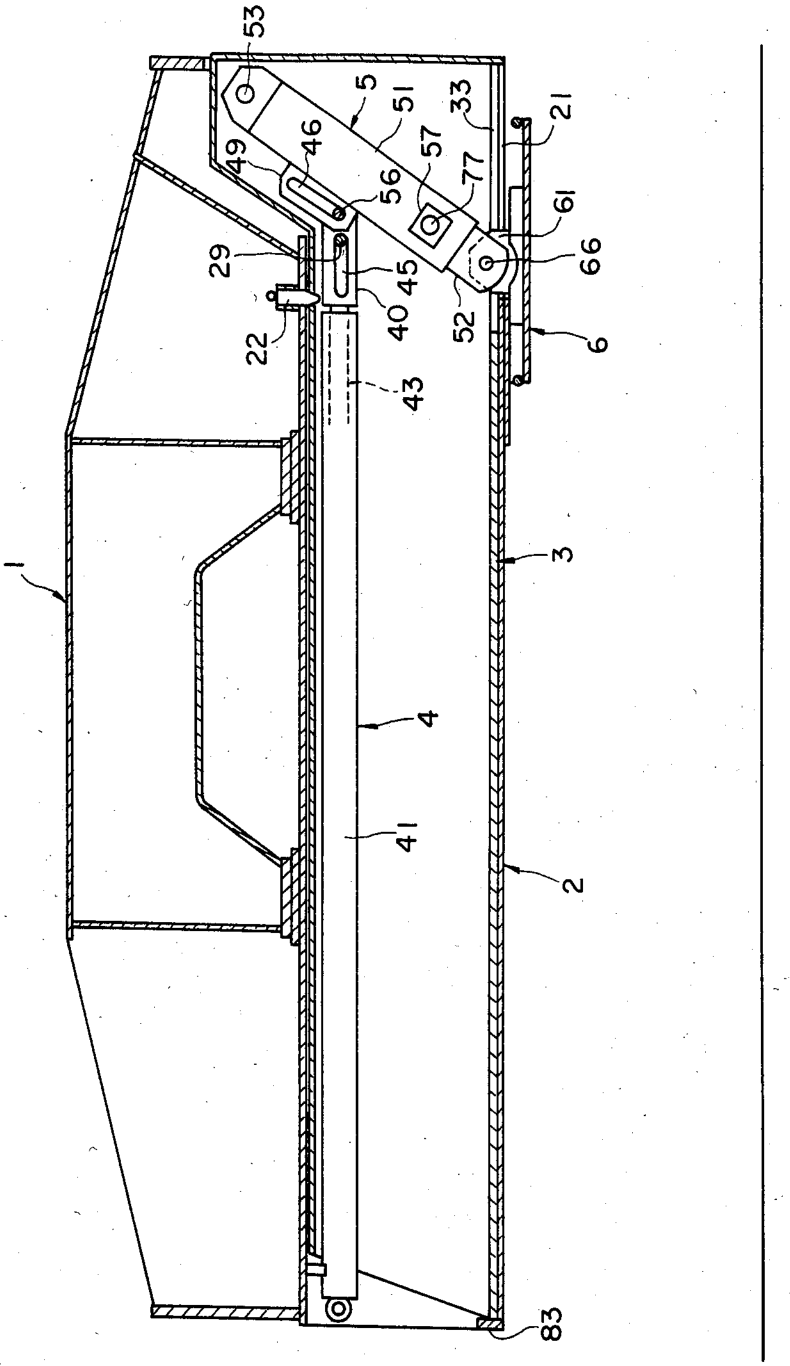
FIG. 19 is a front view, in longitudinal section, of a sixth embodiment of the invention, showing a jack cylinder in its stored position.

The float 6 is swingably installed by pin 66 projecting from the transversely opposite sides of the lower end portion of the rod 52 of the jack cylinder 5 and inserted in elongated holes 62 formed in float attaching seats 61 (FIG. 19).

The functioning will now be described.

Figure 23:
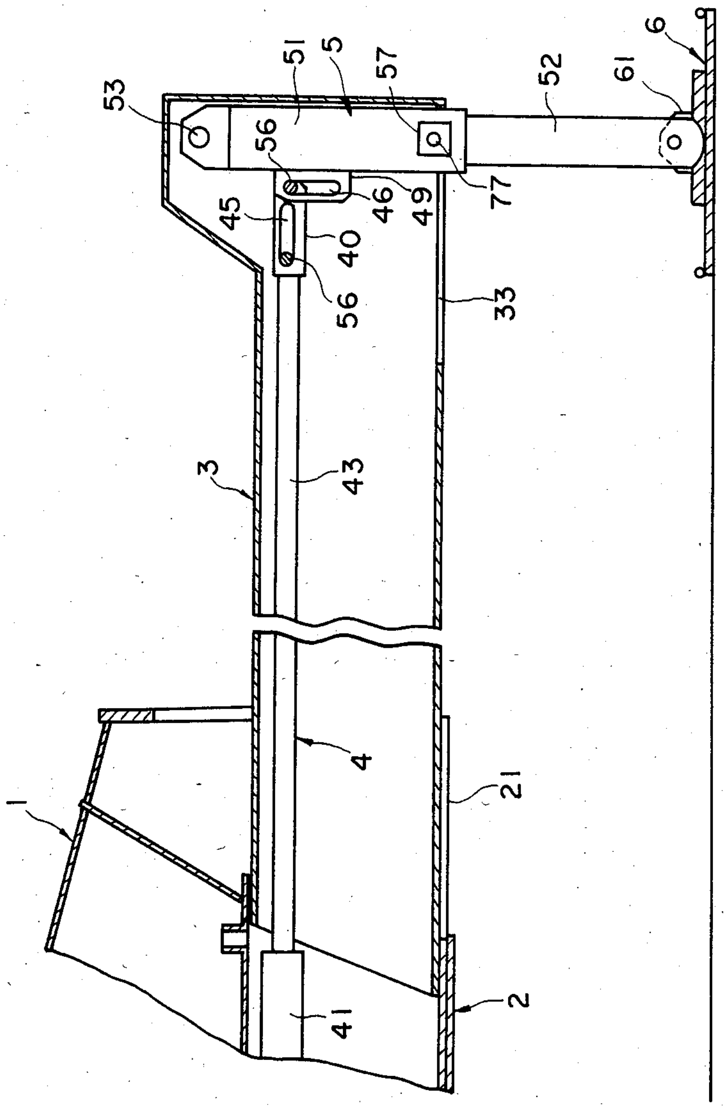
FIG. 23 is a front view, in longitudinal section, showing the operative position.

When the outrigger is used, the extensible cylinder 4 is extended from its state shown in FIG. 19 to extend the extensible beam 3 outwardly laterally of the machine, as shown in FIG. 23 and then the jack cylinder 5 is extended in its vertical position to bring the float 6 into contact with the ground to lift or support the machine to be ready for various types of work.

Figure 20:
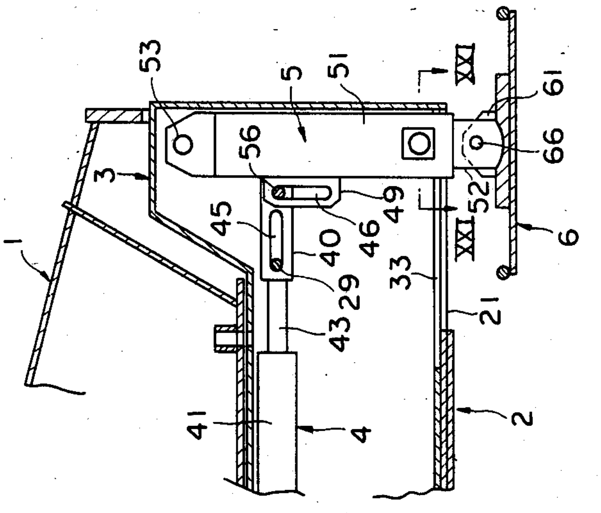
FIG. 20 is a front view, in longitudinal section, of said sixth embodiment, showing the jack cylinder brought to its vertical position.

Thus, when the extensible cylinder 4 starts to extend at the time of extension of said extensible beam 3, the rod 43 of the cylinder 4 performs lost motion (sole motion) operation within the range of the distance of free movement of the pin 29 in the elongated opening 45 in the bracket 40, and during the lost motion stroke of the rod 43 the jack cylinder 5 is pushed by said rod 43 and thereby automatically and forcibly moved from its inclined stored position to its vertical position shown in FIG. 20. At this point of time, the pin 29 completes its movement in the elongated opening 45, so that extension of the extensible beam 3 is then started.

When the jack cylinder 5 assumes its vertical position, as described above, the front end of the locking pin 7 is opposed to the locking hole 71 of the jack cylinder 5, as shown in FIGS. 21 and 22. As the extensible beam 3 is extended, the guiding action of the cam surfaces 81 of the cams 8 installed on the fixed box 2 causes the locking pin 7 to project into the extensible beam 3, until the front end of said locking pin engages the locking hole 77. This prevents the accurrence of play in the jack cylinder during movement of the extensible beam 3.

In addition, when the jack cylinder 5 is extended to bring the float into contact with the ground after the extension of the extensible beam, the jack cylinder 5 is locked in its vertical position by the extensible cylinder 4 and said locking mechanism, thus being prevented from swaying or toppling during operation.

When it is desired to store the outrigger with the jack cylinder 5 contracted, the extensible beam 3 is drawn into the fixed box 2 for storage therein. In the early stage of this extensible beam storage, the rod 43 of the extensible cylinder 4 tends to move alone in the direction opposite to that of extension, but since the jack cylinder 5 is prevented from swinging toward its inclined stored position by the locking pin 7, the extensible beam 3 starts to move as soon as the rod 43 of the extensible cylinder moves. Just before completion of this extensible beam storage, the head 72 of the locking pin 7 climbs up the cam surfaces 81 of the cams 8, releasing said locking pin 7 from the locking hole 77 and thereby unlocking the jack cylinder 5 in its vertical contracted position. Therefore, upon completion of storage of the extensible beam 3, the rod 43 of the extensible cylinder 4 moves alone in the direction opposite to that of extension, during which time the jack cylinder 5 is pulled by the rod 43 and thereby automatically changes from its vertical position shown in FIG. 20 to its inclined stored position shown in FIG. 43. At this instant, the float 6, in the horizontal state, contacts the lower surface of the fixed box 2.

As for the arrangement for interconnecting the extensible cylinder 4 and jack cylinder 5 by means of a pin and an elongated opening, whereas the above embodiment has the pin 56 associated with the extensible cylinder 4 and the elongated opening 46 associated with the jack cylinder 5, it is possible to associate the elongated opening with the extensible cylinder 4 and the pin with the jack cylinder 5. Further, in the above embodiment, jack cylinder 5 is attached to the front end of the extensible beam with the cylinder tube 51 oriented upwardly, but it may be pivotally connected to the front end of the extensible beam in reverse, with the cylinder tube oriented downwardly and the rod 52 oriented upwardly. Such arrangement is advantageous in that since the rod 52 is hidden in the beam 3, the possibility of damage to the rod 52 and incidental oil leakage and malfunction can be prevented.

Figure 24:
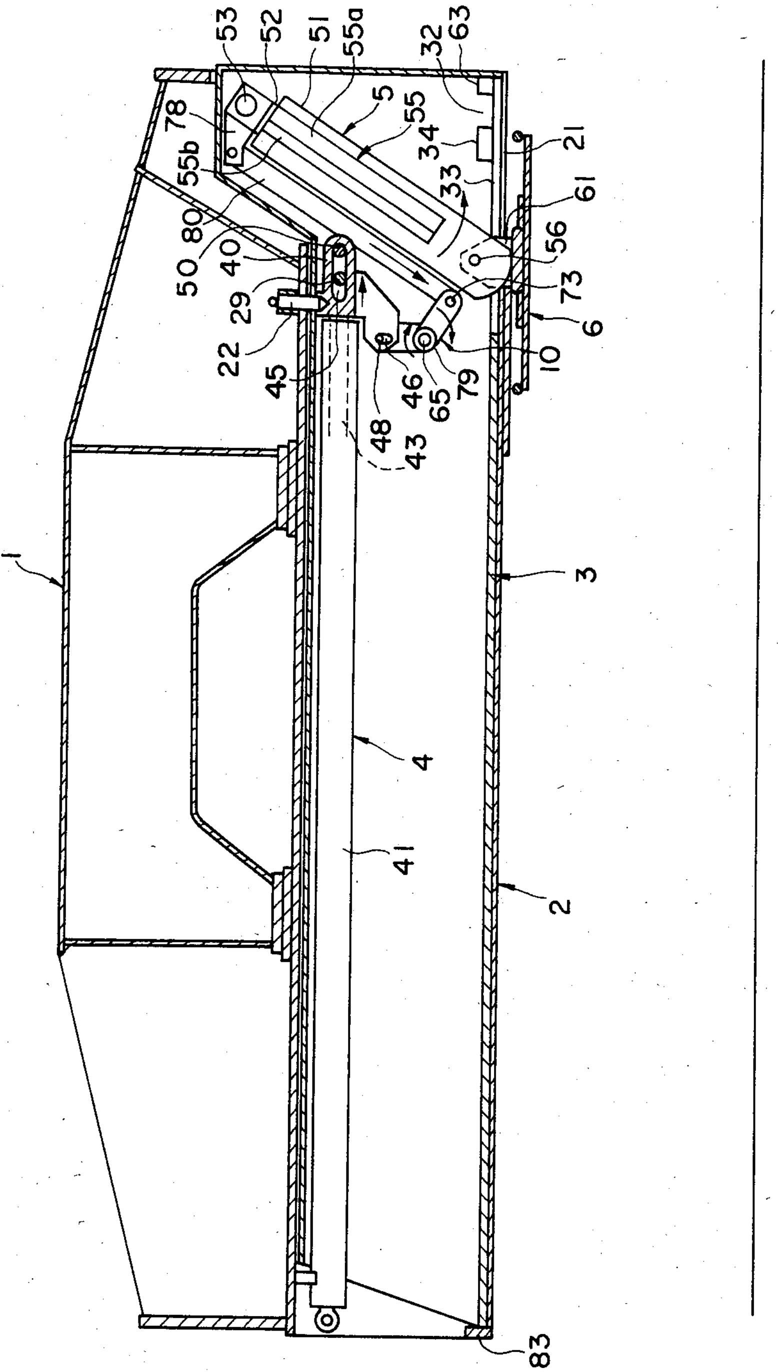
FIG. 24 is a front view, in longitudinal section, of a seventh embodiment of the invention, showing a jack cylinder in its stored position.
Figure 26:
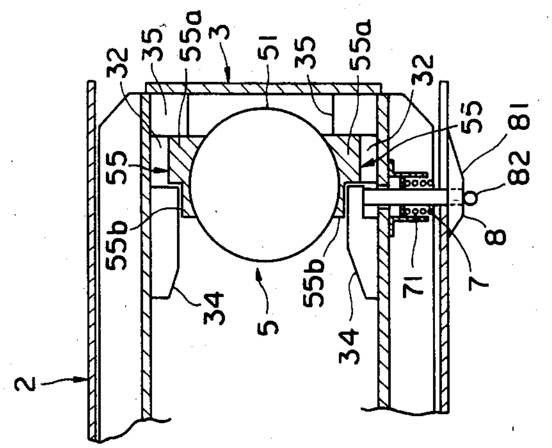
FIG. 26. is a longitudinal section of an eighth embodiment of the invention, showing a jack cylinder in its stored position.
Figure 25:
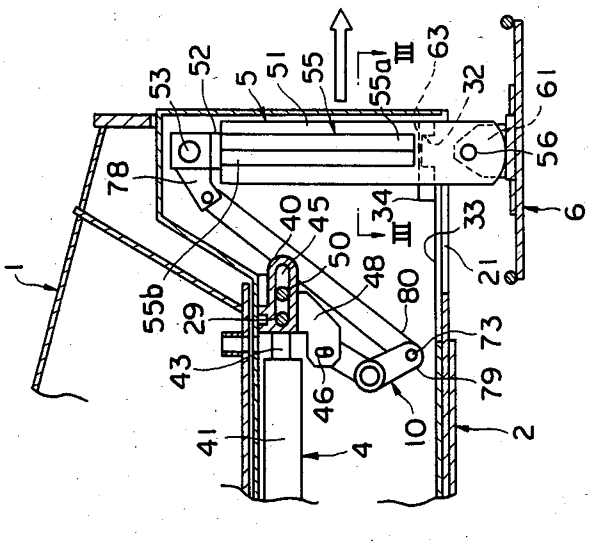
FIG. 25 is a front view, in longitudinal section, showing the jack cylinder brought to its vertical position when the device is used.

Referring to FIGS. 24 through 26 showing a device according to another embodiment of the invention, a bracket 40 is fixed to the rod end of an extensible cylinder 4 and formed with an elongated opening 45 extending in the direction of extension and contraction of said cylinder. An extensible beam 3 has two horizontal pins 29 and 50 internally fixed thereto in its front end portion, the distance between said pins being smaller than the length of said elongated opening 45, said pins 29 and 50 being inserted in said elongated opening 45 so that they are movable along the latter in the range of constant length. Thus, the rod 43 of the extensible cylinder 4 is connected tothe extensible beam 3 so that it is capable of extension in the range of constant length and free movement (lost motion) in the storing direction.

Further, the bracket 40 fixed to the rod end of the extensible cylinder 4 is operatively connected to a jack cylinder 5 successively through a link attaching seat 48 fixed to the lower end of said bracket, a link mechanism 10 consisting of first and second links 79 and 80, and a link attaching seat 78 fixed to the front end of the rod of the jack cylinder 5. The first link 79 of the link mechanism 10 is doglegged and pivotally connected at its middle to the extensible beam 3 by a fixed pin 79. The second link 80 is pivotally connected to the first link 79 by a movable pin 73 so that the links are turnable relative to each other. The first link 79 and the link attaching seat 48 are pivotally connected together through an elongated opening 46 so as to convert linear motion of the rod 43 into rotary motion of the first link 79.

Locking means for locking the jack cylinder 5 in its vertical extended position will now be described.

Projections 55 are formed on the transversely opposite sides of the cylinder tube 51 of the jack cylinder 5, extending from the upper end of said tube to a region close to the lower end. Each projection 55 is stepped so that the outer half 55*a* disposed adjacent the machine width projects to a greater extent than its inner half 55*b* (said outer half 55*a* and said inner half 55*b* being hereinafter referred to as the high land and the low land, respectively). On the other hand, blocks 34 and 63 are fixed to the transversely opposite surfaces of the front end portion of the extensible beam 3 and engaging recesses 32 are defined between said blocks 34 and 63. The engaging recesses 32 are so positioned that they will underlie the high lands 55*a* of the projections 55 on the jack cylinder 5 when said cylinder 5 assumes its vertical contracted position, the width of said recesses being such that the recesses are engageable by the high lands 55*a*. Thus, when the jack cylinder 5 is extended in its vertical position, the high lands 55*a* of the projections 55 will enter the engaging recesses from above and engage the same.

The construction for holding the jack cylinder 5 in its vertical contracted position will now be described.

A locking pin 7 is installed in one of the transversely opposite lower surface regions of the front end portion of the extensible beam 3 through a compression coil spring 71 so that it is capable of resiliently entering and leaving the extensible beam 3. The end of the locking pin 7 projecting outside the extensible beam 3 is formed with a vertically extending long head 82, which engages the outer surfaces of a pair of cams 8 vertically spaced a predetermined distance apart from each other and fixed on the lower outer surface region of the front end portion of the fixed box 2. The outer surface of each cam is formed with an inclined surface 81 downwardly sloping toward the front end of the fixed box 2. As the extensible beam 3 is extended, the head 82 of the locking pin 7 slides along the cam surfaces 81, causing the locking pin 7 to project into the extensible beam 3 until the front end of said locking pin 7 abuts against the low land 55*b* of the associated projection 55 on the jack cylinder 5, which is in its vertical contracted position. This abutting engagement of the locking pin 7 with the projection low land 55*b* prevents the jack cylinder 5 in its vertical contracted position from swinging inwardly of the extensible beam 3.

In addition, notches 21 and 33 are formed in the front lower surface regions of the fixed box 2 and extensible beam 3 to allow for swinging movement of the jack cylinder 5. In FIG. 24, numeral 22 denotes a locking pin for locking the extensible beam 3 in its stored state, and 83 denotes a stop for defining the storage position of the beam 3. From the standpoint of safety it is desirable to provide the proximal end of the extensible beam 3 and the front end of the fixed box 2 with stops (not shown) for limiting the amount of extension of said beam 3 to a constant value.

Figure 27:
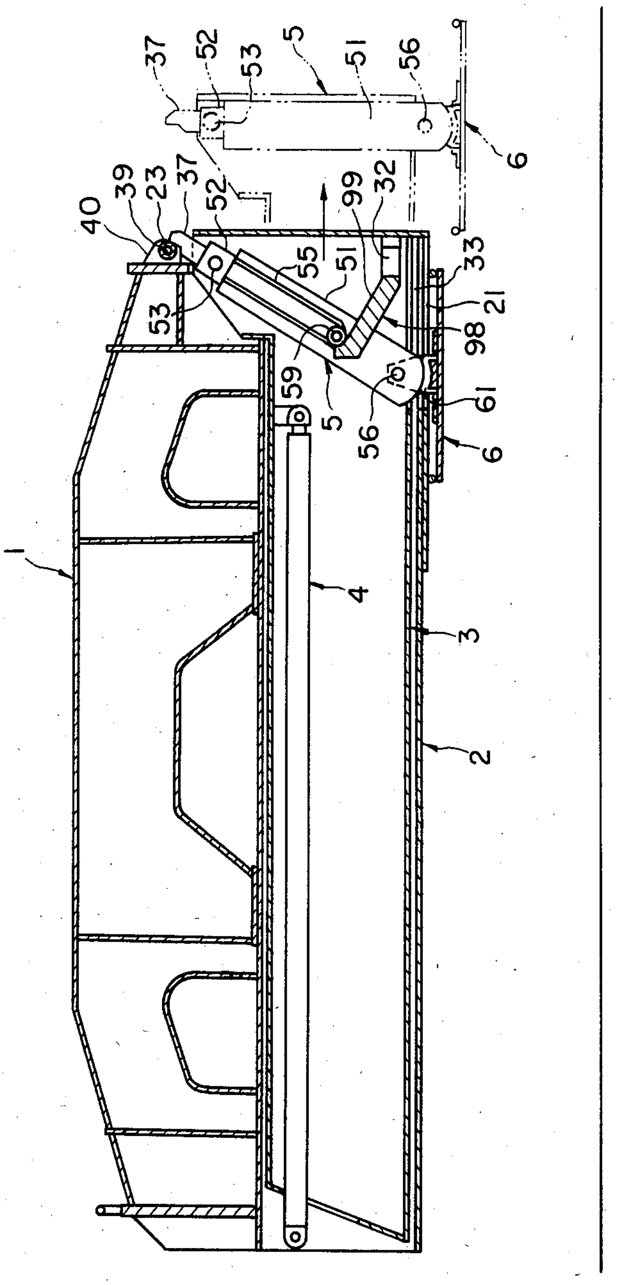
FIG. 27 is a longitudinal section of a ninth embodiment of the invention, showing a jack cylinder in its stored position.
Figure 28:
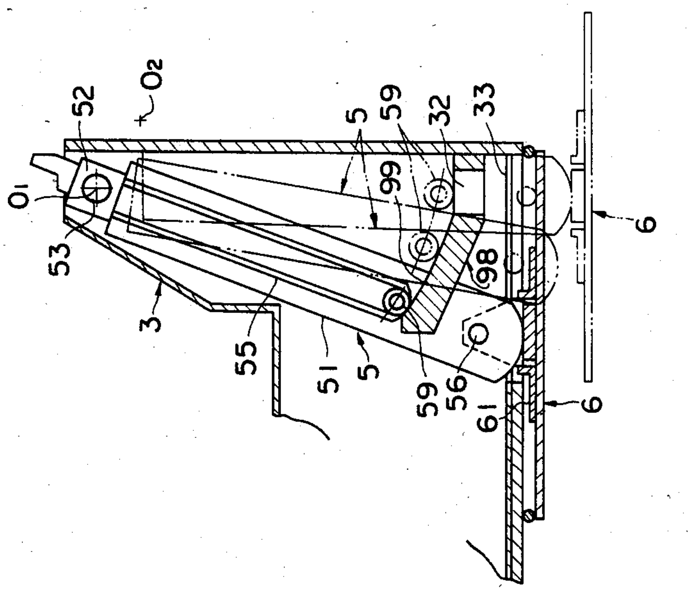
FIG. 28 is a view for an explanation of the forced movement of said cylinder form its inclined stored position to its vertical position.

Referring now to FIGS. 27 and 28 showing another embodiment of the invention, a projection 37 is formed on the upper end of the jack cylinder 5, i.e., on the front end of the rod 52, while a transversely extending horizontal pusher pin 39 is fixed to the front upper portion of a fixed box 2 at a level corresponding to that of said projection through the intermediary of a bracket 40. Numeral 23 denotes a collar fitted on said pusher pin 39. The projection 37 on the jack cylinder 5 will abut against the pusher pin 39 immediately before the end of a stroke for drawing the beam 3 during extensible beam storage operation and will be pushed by the pusher pin 39 on the remaining stroke, so that the jack cylinder 5 will be automatically swung into its inclined stored position. In addition, the abutment surface of the projection 37 associated with the pusher pin 39 is doglegged, as shown, to provide for stabilized abutted condition.

Projections 55 of U-shaped cross-section are provided on the transversely opposite sides of the cylinder tube 51 of the jack cylinder 5, extending from the upper end of said tube to a predetermined lower position, and a roller 59 is rotatably attached to the lower end of said projection in such a manner as to project downwardly beyond said lower end to some extent. On the other hand, the transversely opposite inner surfaces of the extensible beam 3 are integrally formed with cams 98 each having a cam surface 99 on their upper surface, said cams being positioned below said rollers 59. The cam surface 98 of each cam 99 is formed along an inclined arcuate path which extends to recede from said roller 59 as the jack cylinder 5 moves from its inclined stored to vertical position, or which has its center of curvature located at point $0_2$ (FIG. 28) which is spaced from the pivot axis $0_1$ of the jack cylinder 5 laterally outside the machine, so that when the jack cylinder 5 is in its inclined stored position, the roller 59 is in contact with the inner end of the cam surface 99. In addition, the cam surface may not be the described arcuate curved surface but instead be a straight inclined surface extending along said inclined path. The portion of the cam 98 extending outwardly from the surface 99 is horizontal and is formed with an engaging recess 32. The engaging recess 32 has such a width that it is engageable by the associated projection 55 on the jack cylinder 5, and the recess is so positioned as to be bisected by a perpendicular line extending downwardly from the pivot axis $0_1$ of the jack cylinder 5. Thus, when the jack cylinder 5 assumes its vertical contracted position, the projections 55 overlie the engaging recesses 32, and when the jack cylinder 5 is extended in this position, the recesses 55 descend to engage the engaging recesses 32.

In addition, notches 21 and 33 are formed in the front lower surface regions of the fixed box 2 and extensible beam 3 to allow for swinging movement of the jack cylinder 5.

In such arrangement, when the outrigger is used with the extensible beam 3 extended outwardly laterally of the machine, the jack cylinder 5 is extended in its vertical position to bring the float 6 into contact with the ground to lift or support the machine to be ready for various types of work.

Figure 30:
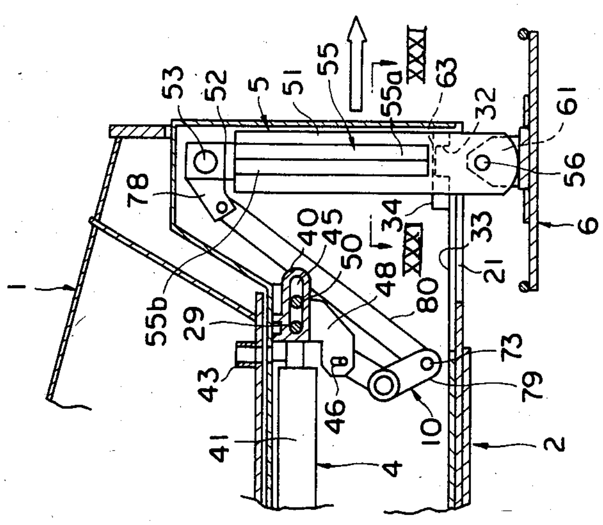
FIG. 30 is a front view, in longitudinal section, showing the jack cylinder brought to its vertical position when the device is used.
Figure 29:
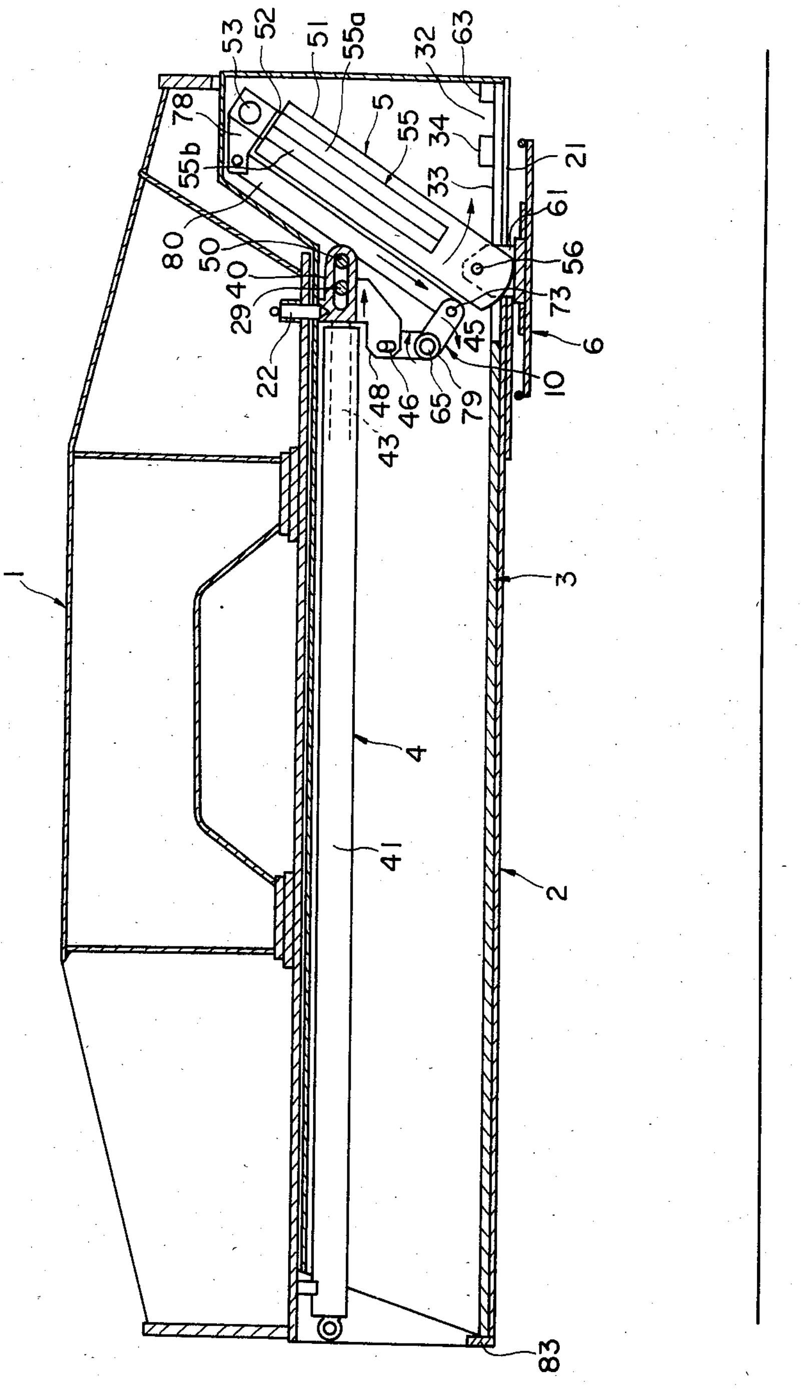
FIG. 29 is a front view, in longitudinal section, of a tenth embodiment, showing a jack cylinder in its stored position.
Figure 31:
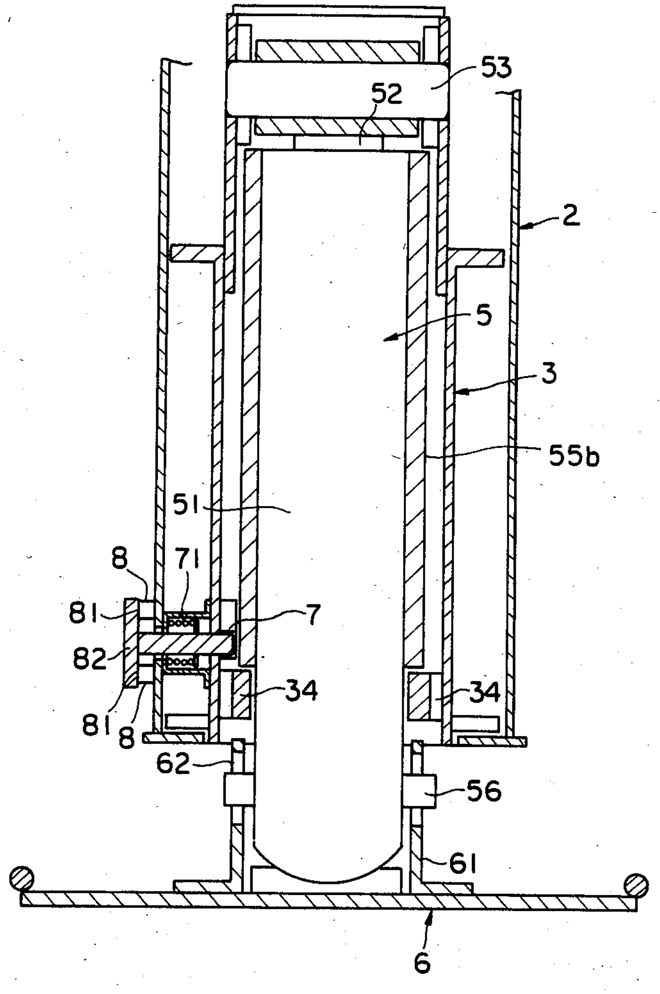
FIG. 31 is a section taken along the line XXXI—XXXI in FIG. 30.

Referring to FIGS. 29 through 31 showing another embodiment of the invention, an extensible beam 3 has two horizontal pins 29 and 50 internally fixed thereto in its front end portion, the distance between said pins being smaller than the length of an elongated opening 45 so that they are movable within the range of constant length. Thus, the arrangement is such that the rod 43 of an extensible cylinder 4 is capable of extension within the range of constant length with respect to the extensible beam 3 and of free movement (lost motion) in the storing direction.

A bracket 40 fixed to the rod end of the extensible cylinder 4 is operatively connected to a jack cylinder 5 successively through a link attaching seat 48 fixed to the lower end of said bracket, a link mechanism consisting of first and second links 79 and 80, and a link attaching seat 78 fixed to the front end of the rod of the jack cylinder 5. The first link 79 of the link mechanism is doglegged and pivotally connected at its middle portion to the extensible beam 3 by a fixed pin 65. The second link 80 is pivotally connected to the first link 79 by a movable pin 73 so that the links are turnable relative to each other. The first link 79 and the link attaching seat 48 are pivotally connected together through an elongated opening 46 so as to convert linear motion of the rod into rotary motion of the first link 79.

Locking means for locking the jack cylinder 5 in its vertical extended position will now be described.

Projections 55 are formed on the transversely opposite sides of the cylinder tube 51 of the jack cylinder 5, extending from the upper end of said tube to a region close to the lower end. Each projection 55 is stepped so that the outer half 55*a* disposed adjacent the machine width projects to a greater extent than the inner half 55*b* (said outer half 55*a* and said inner half 55*b* being hereinafter referred to as the high land and the low land, respectively). On the other hand, blocks 34 and 63 are fixed to the transversely opposite surfaces of the front end portion of the extensible beam 3 and engaging recesses 32 are defined between said blocks 34 and 63. The engaging recesses 32 are so positioned that they will underlie the high lands 55*a* of the projections 55 on the jack cylinder 5 when said cylinder assumes its vertical contracted position, the width of said recesses being such that the recesses are engageable by the high lands 55*a*. Thus, when the jack cylinder 5 is extended in its vertical position, the high lands 55*a* of the projections 55 will enter the engaging recesses from above and engage the same.

The construction for holding the jack cylinder in its vertical contracted position will now be described.

A locking pin 7 is installed in one of the transversely opposite lower surface regions of the front end portion of the extensible beam 3 through a compression spring 71 so that it is capable of resiliently entering and leaving the extensible beam 3. The end of the locking pin 7 projecting outside the extensible beam 3 is formed with a vertically extending long head 82, which engages the outer surfaces of a pair of cams 8 vertically spaced a predetermined distance apart from each other and fixed on the lower outer surface region of the front end portion of the fixed box 2. The outer surface of each cam is formed with an inclined cam surface 81 downwardly sloping toward the front end of the fixed box 2. As the extensible beam 3 is extended, the head 82 of the locking pin 7 slides along the cam surfaces 81, causing the locking pin 7 to project into the extensible beam 3 until the front end of said locking pin 7 abuts against the low land 55*b* of the associated projection on the jack cylinder 5, which is in its vertical contracted position. This abutting engagement of the locking pin 7 with the projection low land prevents the jack cylinder 5 from swinging inwardly of the extensible beam 3.

Figure 32:
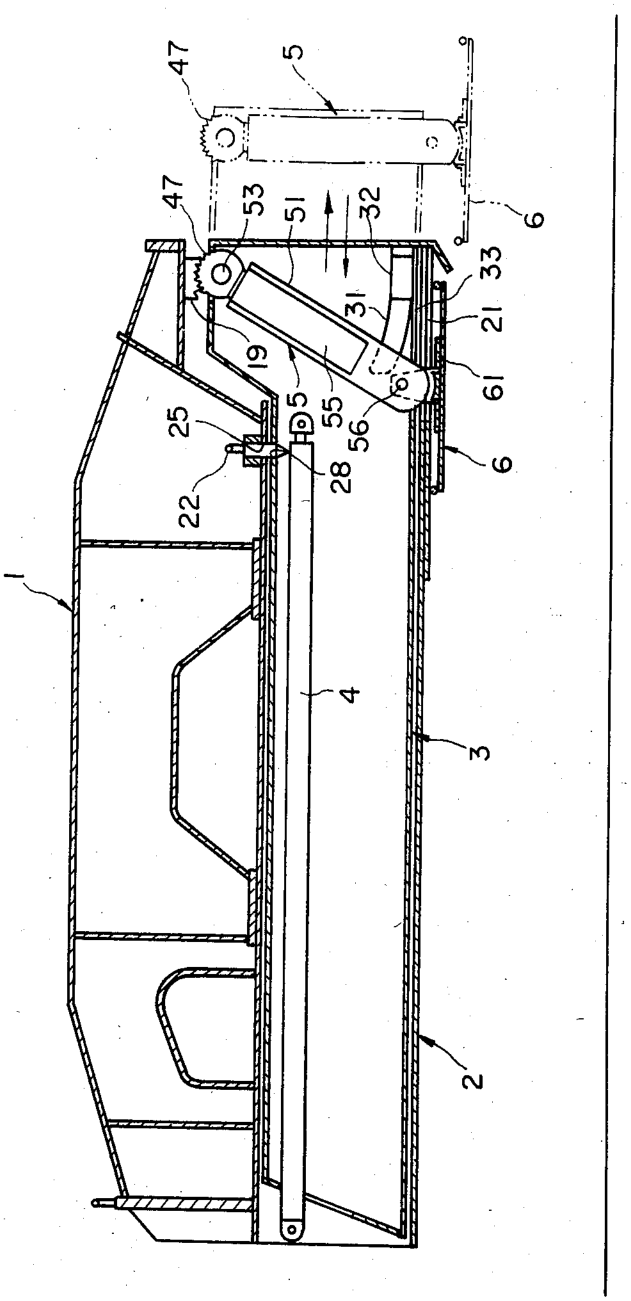
FIG. 32 is a longitudinal section of an eleventh embodiment of the invention, showing a jack cylinder in its stored position.
Figure 33:
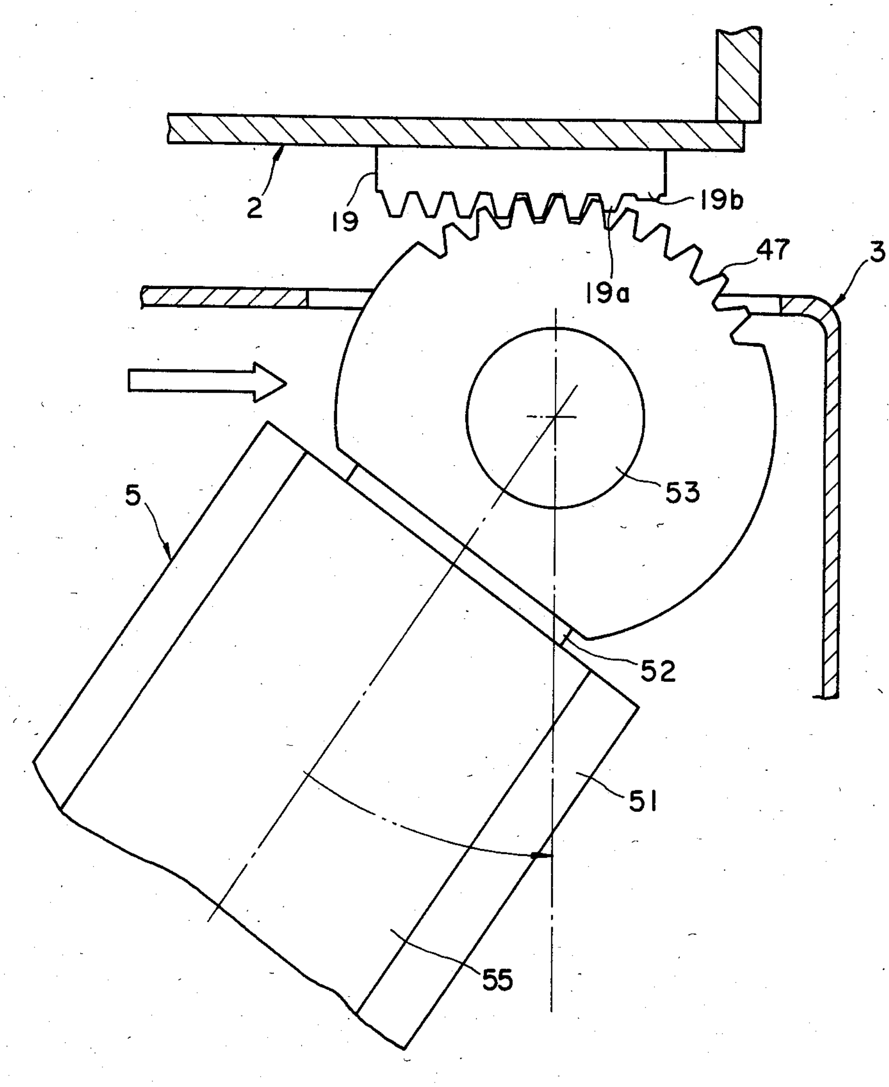
FIG. 33 is an enlarged view showing a rack and pinion combination in said eleventh embodiment.
Figure 34:
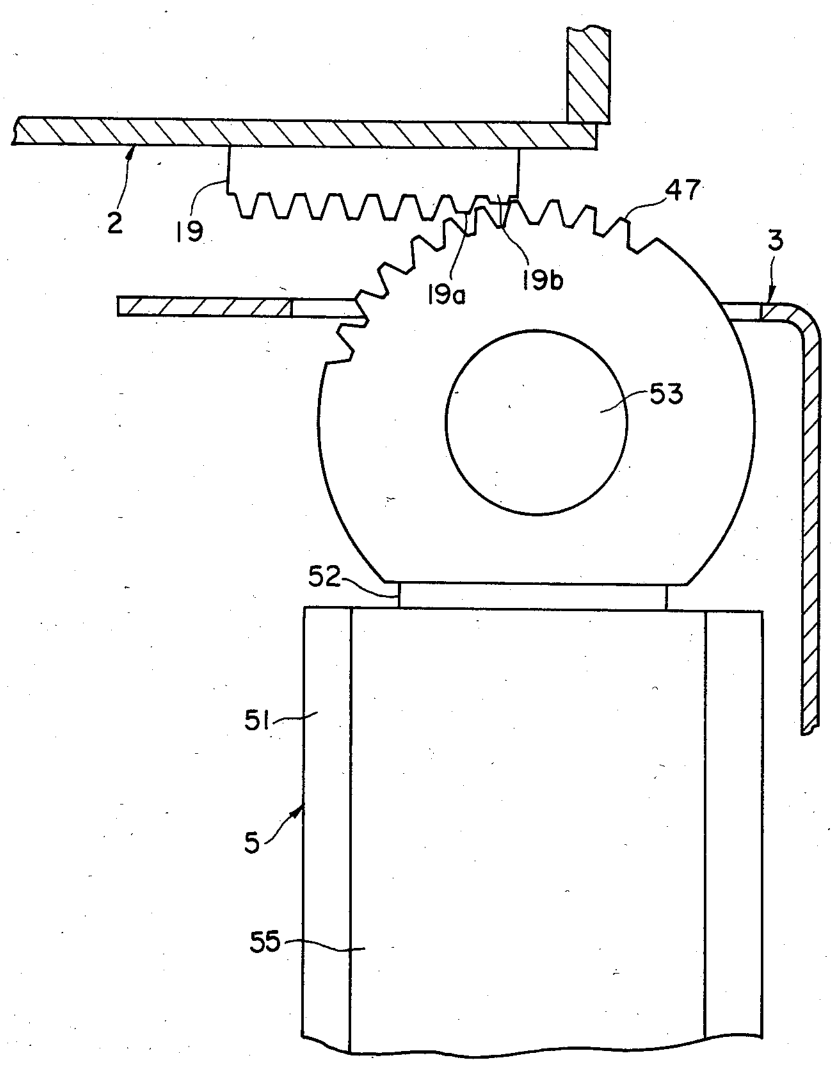
FIG. 34 is a view corresponding to FIG. 33, showing an extensible beam in the early stage of its extension.
Figure 35:
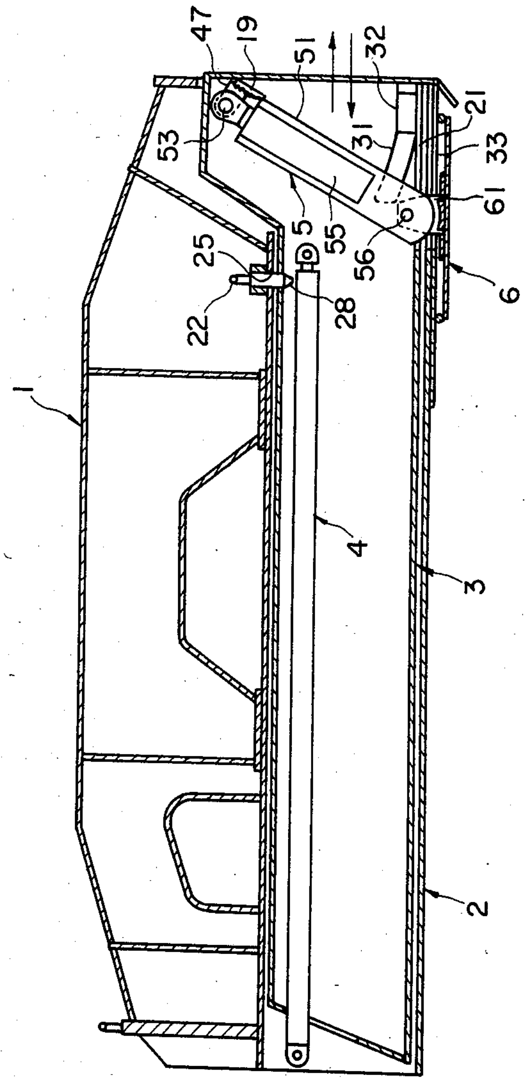
FIG. 35 is a longitudinal section of a twelfth embodiment, showing a jack cylinder in its stored position.

Referring now to FIGS. 32 through 34 showing a device according to another embodiment of the invention, a pinion 47 is installed at the upper end of a jack cylinder 5, i.e., at the front end of a rod 52 pivotally connected to an extensible beam 3, while a rack 19 is fixed to the front end of a fixed box 2, which rack is adapted to mesh with said pinion from above when the extensible beam 3 is in its stored state. Thus, the rack 19 meshes with the pinion 47 when the extensible beam 3 is in its state, the meshing force holding the jack cylinder 5 in its inclined stored position. In the initial stage of extension and the terminal stage of storage of the extensible beam 3, the rack 19 meshes with the pinion 47, automatically swinging the jack cylinder 5 from its inclined stored to a vertical position and vice versa. In addition, to ensure smooth engagement and disengagement of the pinion with respect to the rack, as shown in FIGS. 33 and 34, the top portions of the two outer teeth 19*a* and 19*b* of the rack are stepwise cut off.

Locking means for holding the jack cylinder 5 in its vertical position will now be described.

Projections 55 are provided on the transversely opposite sides of the cylinder tube 51 of the jack cylinder 5, extending from the upper end of said tube to a predetermined position of the lower portion. On the other hand, guides 31 extending along an arcuate curve having its center of curvature located at the axis of the pivot 53 of the jack cylinder 5 are fixed to the transversely opposite lower inner surface regions of the front end portion of the extensible beam 3, with the lower end surfaces of said projections 55 on the jack cylinder 5 being opposed to said guides 31. Each guide 31 is formed with an engaging recess 32 whose centerline coincides with a perpendicular extending from the pivot axis 53 of the jack cylinder 5 and whose width is such that the engaging recess is engageable by the associated projection 55. Thus, when the jack cylinder 5 assumes its vertical position, the projections 55 overlie the engaging recesses 32, and when said cylinder 5 is extended, the projections 55 enter the engaging recesses 32 and engage the same, as shown in FIGS. 33 and 34.

In addition, notches 21 and 33 are formed in the front lower surface regions of the fixed box 2 and extensible beam 3 to allow for swinging movement of the jack cylinder 5. Numeral 25 denotes a locking hole formed in the front upper surface region of the fixed box 2, and 28 denotes a locking hole formed in the front upper surface region of the extensible beam 3. A locking pin 22 is inserted in these locking holes 25 and 28 to lock the extensible beam 3 in its stored state.

In such arrangement, when the outrigger is used, with the extensible beam 3 extended outwardly laterally of the machine the jack cylinder 5 is extended in its vertical position to bring the float 6 into contact with the ground to float the machine to be ready for various types of work. In this case, the jack cylinder 5 is locked in its vertical position in that the projections 55 on the jack cylinder 5 engage the engaging recesses 32 of the guides 31 on the extensible beam 3, whereby the jack cylinder is prevented from swaying or toppling during operation.

For storing the outrigger from this state, it is seen that immediately before the extensible beam 3 is completely stored in the fixed box 2, the pinion 47 on the upper end of the jack cylinder 5 engages the rack 19 on the fixed box 2, and on the remaining stroke extending from this point to the point where the extensible beam 3 is completely stored in the fixed box 2, the engagement between the rack 19 and the pinion 47 causes the jack cylinder 5 to automatically swing from its vertical to an inclined stored position. At this instant, the float 6, held horizontal, comes in intimate contact with the lower surface of the fixed box 2.

When the extensible beam 3 is extended from this state, the engagement between the rack 19 and the pinion 47 established in the initial stage of this extension causes the jack cylinder 5 to automatically swing from its inclined stored position shown in FIGS. 32 and 33 to its vertical position shown in FIG. 34, whereupon the pinion is disengaged from the rack.

Since the present device is so arranged that the swinging movement of the jack cylinder 5 between its vertical position and its inclined stored position is effected by the engagement between the pinion 47 on the upper end of the jack cylinder 5 and the rack 19 on the fixed box 2, as described above, there is no need to provide an exclusive drive source, such as a hydraulic cylinder, for swinging the jack cylinder 5, so that the construction is very simple, the cost is low and extra operations are unnecessary. Further, the change of the jack cylinder 5 from its inclined stored position to a vertical position and vice versa can be reliably and smoothly effected.

Figure 37:
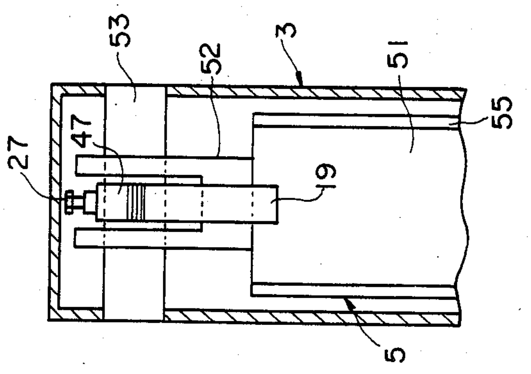
FIG. 37 is a section taken along the line XXXVII—XXXVII in FIG. 36.
Figure 38:
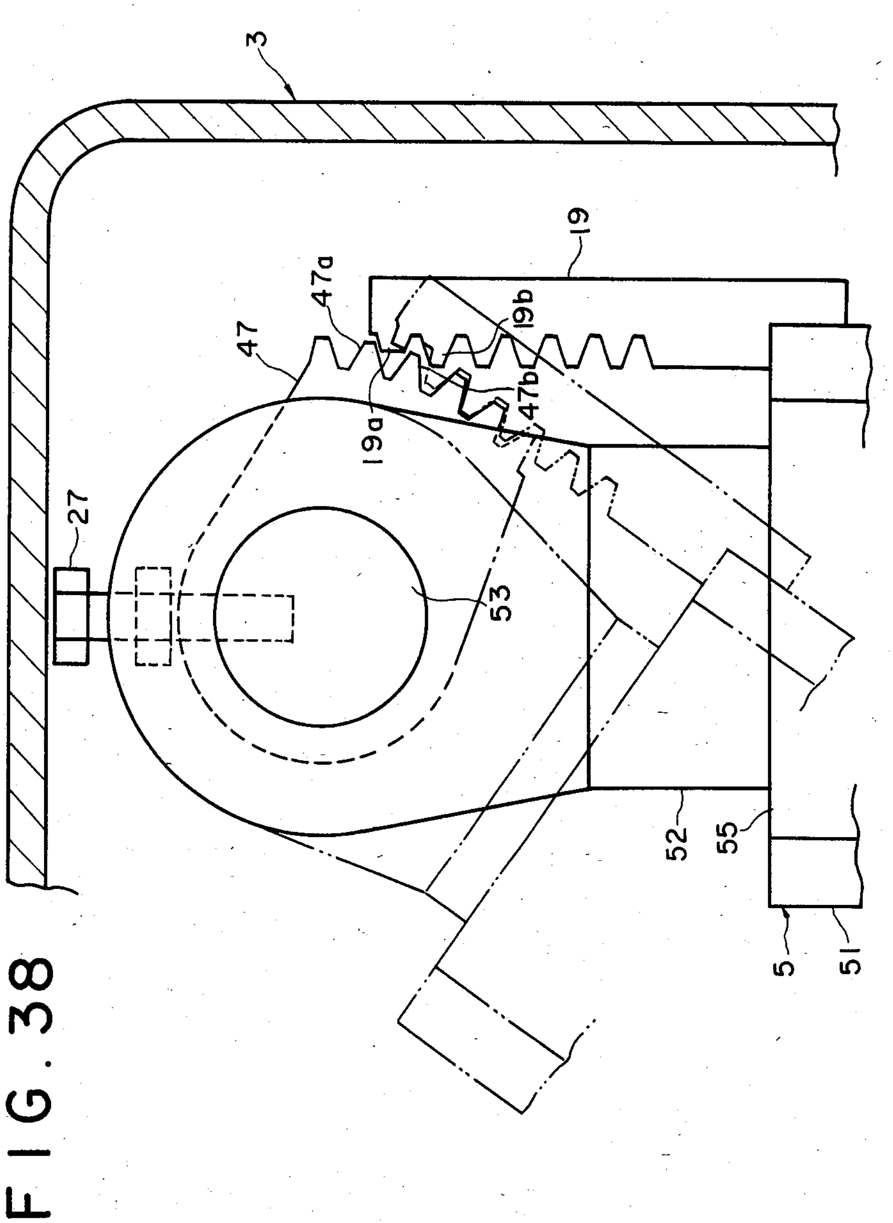
FIG. 38 is an enlarged view of a rack and pinion combination shown in the state of FIG. 36.

Referring to FIGS. 35 through 38 showing a device according to another embodiment of the invention, a rack 19 is fixed to the upper end of the outer side of the cylinder tube 51 of a jack cylinder 5 and at a position where it is opposed to the outer side of an extensible beam 3, said rack being upright with its teeth directed inwardly laterally of the beam. On the other hand, a pinion 47 is fitted on a horizontal pin 53 which provides a pivot axis for said cylinder 5, said pinion being fixed to said pin 53 by a bolt 27 with its teeth directed outwardly laterally of the extensible beam. Thus, the jack cylinder 5 is provided with the rack 19 adapted to move axially of the jack cylinder 5 as the latter extends and contracts, while the extensible beam 3 is provided with the pinion 47 fixed thereto. The uppermost tooth 19*a* of the rack 19 has its top portion cut off so that it is shorter than the other teeth, as shown in FIG. 38. Thus, when the jack cylinder 5 is contracted in its vertical position, the uppermost tooth 19*a* meshes with a particular tooth 47*a* (hereinafter referred to as the meshing tooth) of the pinion from below in the terminal contraction stage (immediately before completion of contraction).

Locking means for holding the jack cylinder 5 in its vertical position will now be described.

Figure 36:
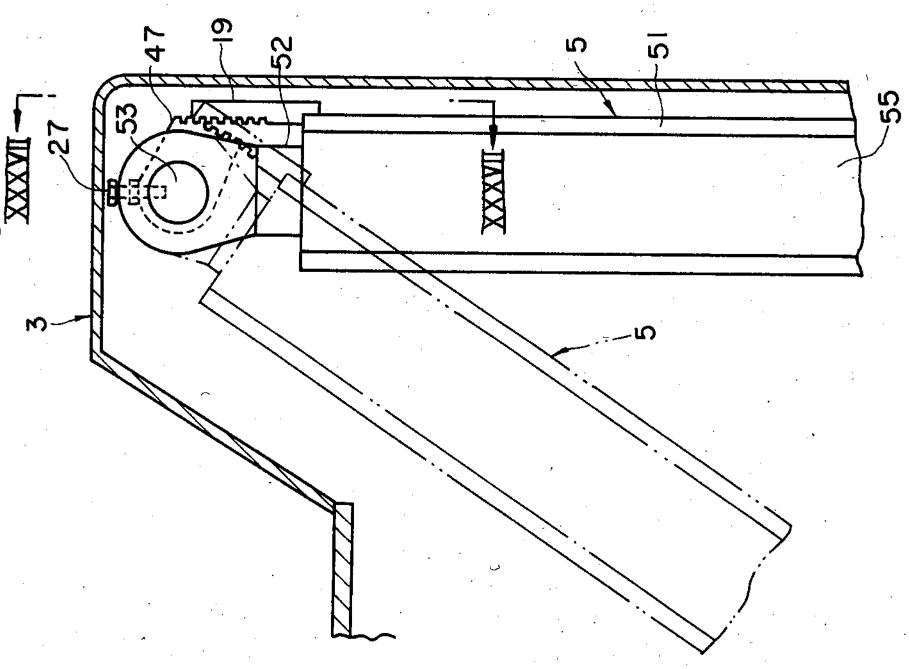
FIG. 36 is an enlarged view of said jack cylinder in its vertical position.

Guides 31 extending along an arcuate curve having its center of curvature located at the axis of the pivot 53 of the jack cylinder 5 are fixed to the transversely opposite lower inner surface regions of the front end portion of the extensible beam 3, with the lower end surfaces of projections 55 on the jack cylinder 5 being opposed to said guides 31. Each guide 31 is formed with an engaging recess 32 whose centerline coincides with a perpendicular extending downwardly from the axis of the pivot 53 of the jack cylinder 5 and whose width is such that the engaging recess is engageable by the associated projection 55. Thus, when the jack cylinder 5 assumes its vertical position, the projections 55 overlie the engaging recesses 32, and when said jack cylinder 5 is extended, the projections 55 enter the engaging recesses 32 and engage the same, as shown in FIGS. 36 and 37.

In addition, notches 21 and 33 are formed in the front lower surface regions of the fixed box 2 and extensible beam 3 to allow for swinging movement of the jack cylinder 5. Numeral 25 denotes a locking hole formed in the front upper surface region of the fixed box 2, and 28 denotes a locking hole formed in the front upper surface region of the extensible beam 3. A locking pin 22 is inserted in these holes 25 and 28 to lock the extensible beam 3 in its stored state.

Figure 39:
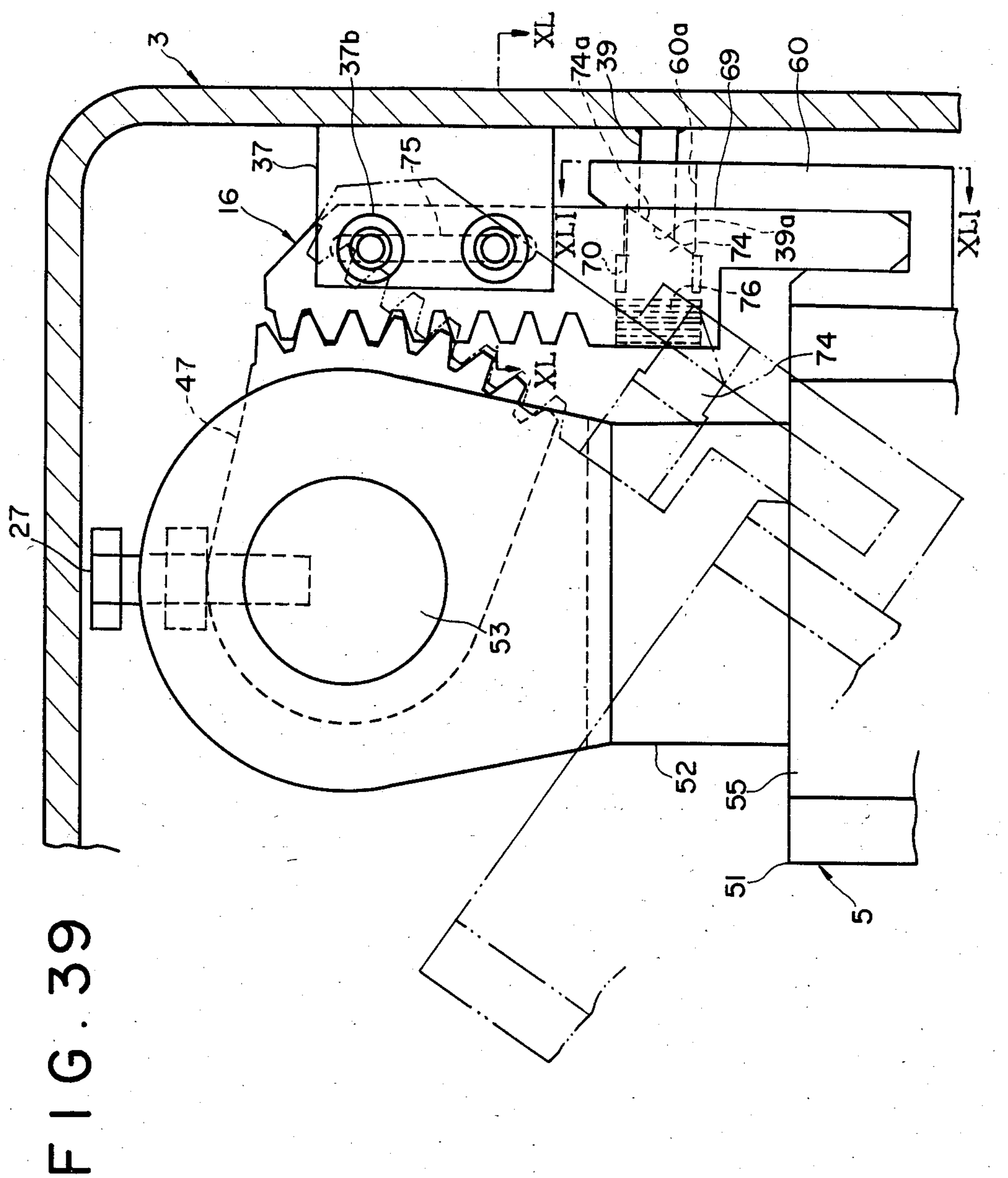
FIG. 39 is a view corresponding to FIG. 38, showing a thirteenth embodiment of the invention.
Figure 40:
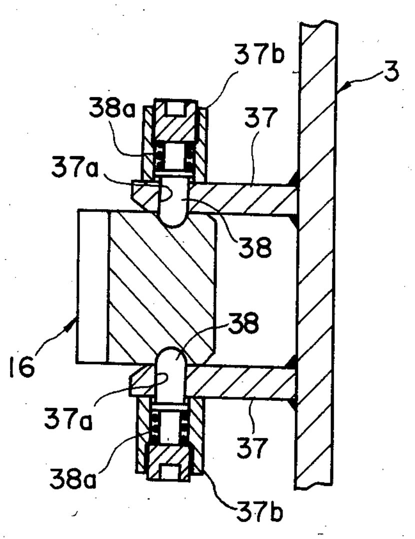
FIG. 40 is a section taken along the line XL—XL in FIG. 39.
Figure 41:
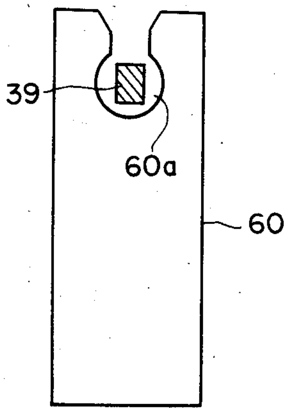
FIG. 41 is a section taken along the line XLI—XLI in FIG. 39.

Referring to FIGS. 39 through 41 showing a device according to another embodiment of the invention, the device is so arranged that a jack cylinder 5 and a rack 16 execute unitary movement only in the terminal stage of contraction and the initial stage of extension of said cylinder 5 but that thereafter the rack 16 is separated from the jack cylinder 5 and maintained in meshing engagement with a pinion 47. That is, the preceding embodiment is modified so that an L-shaped rack fitting frame 60 is fixed to the upper end of the outer side of the cylinder tube of the jack cylinder 5 to which the rack 19 of the preceding embodiment was fixed. The rack fitting frame 60 has an upwardly opened keyhole-like notch 60*a* in its upper end. On the other hand, the rack 16 is separate from the jack cylinder 5 and its lower portion is formed with a leg 69, the root of which is formed with a stepped hole 70 in which an engaging body 74 is installed through a spring 76 so that said body is capable of resiliently coming in and out. Further, the transversely opposite surfaces of said rack 16 are each formed with a vertically extending groove 75. A pair of transversely spaced projections 37 are provided on the upper inner surface region of the front end portion of the extensible beam 3, and pin-receiving holes 37*a* are formed in said projections 37 in their upper and lower regions. Cylindrical bodies 37*b* are fixed to the outer surfaces of said projections 37 at the positions where said pin-receiving holes 37*a* are formed. Rack retaining pins 38 are resiliently held in the cylindrical bodies 37*b* through springs 38*a* so that their front ends normally project outside the pin-receiving holes 37*a*. A pusher pin 39 is fixed to the front end wall of the extensible beam 3 and below said projections 37. The front end surface 39*a* of the pusher pin 39 and the front end surface 74*a* of the engaging body 74 are in the form of inclined surfaces complementary to each other.

Thus, the rack 16 and pinion 47 are in meshing engagement all the time, and when the jack cylinder 5 is in its extended position, the rack 16 is separated from the cylinder 5. At this instant, the rack 16 is held in the extensible beam 4 by being nipped between the rack retaining pins 38 fitted in the grooves 75. Further, at this instant, the pusher pin 39 is fitted in the stepped hole 70 of the rack 16 and pushes the engaging body 74 into the stepped hole 70.

When the jack cylinder 5 is contracted from such state, the rack fitting frame 60 engages the rack 16 in the terminal stage of contraction and the contracting force of said cylinder 5, i.e., the lifting force of the cylinder tube 51 is applied to the area of engagement between the rack 16 and the pinion 31. As a result, the meshing reaction acting on said area of engagement causes the jack cylinder 5 to automatically swing to its inclined stored position, as in the case of the preceding embodiment. At this instant, the pusher pin 39 is disengaged from the stepped hole 70 of the rack 16, so that the engaging body 74 fits in the keyhole-like notch 60*a* of the rack fitting frame 60, thereby integrally interconnecting the rack 16 and jack cylinder 5.

When the jack cylinder 5 is extended, the meshing reaction between the rack 16 and the pinion 47 causes the jack cylinder 5 to swing to its vertical position in the initial stage of extension. When the jack cylinder 5 assumes its vertical position in this manner, the pusher pin 39 pushes the engaging body 74 into the stepped hole 70 to thereby cancel the connection between the rack 16 and the rack fitting frame 60, and concurrently therewith the rack retaining pins 30 fit in the grooves 75 of the rack 16. If, therefore, the jack cylinder 5 is subsequently extended, the rack fitting frame 60 is disengaged from the rack 16. Thus, the jack cylinder 5 extends while leaving the rack 16 behind.

According to the arrangement of this embodiment, since the rack 16 and the pinion 47 are in continuous meshing engagement-time, there is no problem of incorrect meshing, as a matter of course, so that the automatic positional change of the jack cylinder 5 becomes more reliable.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An outrigger device for wheel-mounted working machines having a traveling body, comprising:

a fixed box fixed to said wheel-mounted traveling body;

an extensible beam storably fitted in said fixed box;

a jack cylinder having a longitudinal axis and a float at a lower end portion thereof and;

pivot means establishing a horizontal pivot axis passing through the upper portion of a front end of said extensible beam, through an upper portion of said jack cylinder, and intersecting said longitudinal axis of said jack cylinder, said jack cylinder being swingable around said axis of said pivot means between a vertical position and an inclined stored position where it is drawn inwardly of the extensible beam, where it inclines inwardly and downwardly from said pivot means toward said traveling body and where said float is stored beneath said extensible beam.

2. An outrigger device as set forth in claim 1, further comprising an extensible cylinder pivotally connected at a first end portion thereof to the fixed box and at a second end portion thereof to the jack cylinder so that said extensible cylinder is turnable around an axis extending transversely of the traveling body, extension and contraction of said extensible cylinder causing the jack cylinder to swing between said vertical position and said inclined stored position.

3. An outrigger device as set forth in claim 2, wherein the upper end portion of the jack cylinder further comprises a link member and the extensible cylinder is pivotally connected at a first end portion thereof to the fixed box and at a second end portion thereof to the front end of said link so that said extensible cylinder is turnable around an axis extending transversely of the traveling body, extension and contraction of said extensible cylinder causing said jack cylinder to swing between said vertical position and said inclined stored position.

4. An outrigger device as set forth in claim 1, further comprising an extensible cylinder connected at a first end portion thereof to the fixed box and at a second end portion thereof to the extensible beam, and an auxiliary extensible cylinder pivotally connected at a first end portion thereof to the extensible beam and at a second end portion thereof to the jack cylinder so that said auxiliary cylinder is turnable around an axis extending transversely of the traveling body, extension and contraction of said auxiliary extensible cylinder causing the jack cylinder to swing between said vertical position and said inclined stored position.

5. An outrigger device as set forth in claim 1, wherein said extensible beam further comprises a plurality of projections formed on the inner surface thereof and said jack cylinder further comprises a plurality of projections formed on the peripheral surface thereof and adapted to be opposed to each other axially of the jack cylinder when the jack cylinder assumes said inclined stored position, and wherein said projections further comprise a stop mechanism for preventing extension of the jack cylinder when the jack cylinder is in said inclined stored position, a locking arm projecting from the upper end portion of the jack cylinder, and a locking rod attached to a front end portion of the fixed box for being engaged by said locking arm when the jack cylinder assumes said inclined stored position, such that said locking arm and said locking rod cooperate with each other to prevent extension of the extensible beam when the jack cylinder is prevented from swinging from said inclined stored position to said vertical position.

6. An outrigger device as set forth in claim 1, wherein the extensible beam further comprises a telescopically fitted multi-stage beam assembly, and wherein the jack cylinder is pivotally connected at said pivot means to the front end of the foremost beam of said multi-stage beam assembly so that the jack cylinder is swingable around the axis of said pivot means between said vertical position and said inclined stored position.

7. An outrigger device as set forth in claim 1, further comprising an extensible cylinder connected at a first end thereof to the fixed box and at a second end thereof to the extensible beam so that said extensible cylinder is free to move in the direction of storage of the extensible beam, said extensible cylinder having an elongated opening formed therein, and a pin engaged in said elongated opening, and further comprising a connecting member for connecting the front end of said extensible cylinder to the side of the jack cylinder so that the free movement of the extensible cylinder transmitted through said connecting member causes the jack cylinder to swing between said vertical position and said inclined stored position.

8. An outrigger device as set forth in claim 1, further comprising an extensible cylinder connected at a first end portion thereof to the fixed box and at a second end portion thereof to the extensible beam so that said extensible cylinder is free to move within a range of constant length in the direction of storage of the extensible beam, and further comprising a link mechanism for connecting the second end of said extensible beam to the jack cylinder, such that free movement of said extensible cylinder transmitted through said link mechanism causes the jack cylinder to swing between said vertical position and said inclined stored position.

9. An outrigger device as set forth in claim 8, further comprising connecting means for connecting the second end of the extensible cylinder to the extensible beam wherein said connecting means further comprises an elongated opening extending in the direction of storage of the extensible beam and a projection engaged in said elongated opening and free to move therein.

10. An outrigger device as set forth in claim 1, further comprising a projection provided on the upper end portion of the jack cylinder for being pushed by a front end portion of the fixed box when the extensible beam is stored, thereby causing the jack cylinder to swing from said vertical position to said inclined stored position.

11. An outrigger device as set forth in claim 1, wherein said jack cylinder further comprises a projection provided on an outer surface thereof, and further comprising a member mounted on an inner surface portion of the extensible beam and positioned below the level of said projection, wherein said member further comprises a cam surface extending along an inclined path which extends to recede from said projection as said jack cylinder moves from the inclined stored position to the vertical position.

12. An outrigger device as set forth in claim 1, wherein the jack cylinder further comprises a cylinder tube and a rod, an upper end portion of said rod being pivotally connected to the front end of the extensible beam at said pivot means.

13. An outrigger device as set forth in claim 1, further comprising a pinion fixed to the upper end of the jack cylinder, and a rack meshing with said pinion and fixed to the front end of the fixed box, the engagement between pinion and said rack causing said jack cylinder to swing between said vertical position and said inclined stored position.

14. An outrigger device as set forth in claim 1, wherein said jack cylinder further comprises a cylinder tube and a rod, a front end portion of said rod being pivotally connected to a front end portion of the extensible beam at said pivot means, and a rack mounted on an upper outer lateral region of said cylindrical tube such that said rack is upright, with teeth of said rack being directed inwardly laterally of the extensible beam, wherein the extensible beam further comprises a pinion fixed on the front end thereof, teeth of said pinion being directed outwardly laterally of the extensible beam, such that in a terminal stage of the contraction of the jack cylinder said rack and said pinion mesh with each other and the meshing reaction causes the jack cylinder to swing to said inclined stored position.

15. An outrigger device as set forth in claim 14, wherein an uppermost tooth of the teeth of said rack is shorter than the remaining teeth.

* * * * *